United States Patent [19]

Esselink

[11] 4,350,500
[45] Sep. 21, 1982

[54] PROCESS AND APPARATUS FOR SEPARATING GASEOUS COMPONENT FROM A MIXTURE

[75] Inventor: Abraham J. Esselink, Voorschoten, Netherlands

[73] Assignee: Ingeniersbureau "Essex" B.V., Voorschoten, Netherlands

[21] Appl. No.: 169,053

[22] Filed: Jul. 15, 1980

[30] Foreign Application Priority Data

Jul. 17, 1979 [NL] Netherlands .................. 7905561

[51] Int. Cl.³ ............................................. B01D 53/04
[52] U.S. Cl. ......................................... 55/26; 55/58; 55/62; 55/68; 55/75
[58] Field of Search ............... 55/25, 26, 58, 62, 66, 55/68, 74, 75, 179, 180, 387, 389

[56] References Cited

U.S. PATENT DOCUMENTS

| | | | |
|---|---|---|---|
| 3,103,425 | 9/1963 | Meyer | 55/62 |
| 3,123,453 | 3/1964 | Loomer et al. | 55/62 X |
| 3,176,444 | 4/1965 | Kiyonaga | 55/26 |
| 3,338,030 | 8/1967 | Feldbauer, Jr. | 55/25 |
| 3,564,816 | 2/1971 | Batta | 55/62 X |
| 3,788,036 | 1/1974 | Lee et al. | 55/25 |
| 3,977,845 | 8/1976 | Walter | 55/25 |
| 3,986,849 | 10/1976 | Fuderer et al. | 55/25 |
| 4,194,890 | 3/1980 | McCombs et al. | 55/25 X |
| 4,234,322 | 11/1980 | De Meyer et al. | 55/25 X |

FOREIGN PATENT DOCUMENTS 2624346 12/1977 Fed. Rep. of Germany .......... 55/25

Primary Examiner—Robert H. Spitzer
Attorney, Agent, or Firm—Sughrue, Mion, Zinn, Macpeak & Seas

[57] ABSTRACT

The invention provides an improved, efficient adiabetic pressure swing adsorption process for separating gas mixtures, using a multiplicity of adsorption zones, each zone in a sequential order and in a fixed overlapping with other zones undergoing cycles in a number of stages, including adsorption under high pressure, depressurization via its outlet, depressurization via its inlet, purging from outlet to inlet and repressurization via its outlet, in conjunction with one or two columns, filled essentially with an inert and non-porous packing of high void fraction.

7 Claims, 22 Drawing Figures

| PERIOD | VALVE POSITION OPEN | | | | | | | | | | | | SWITCHOVER | | |
|---|---|---|---|---|---|---|---|---|---|---|---|---|---|---|---|
| | | | | | | | | | | | | | 100[a] | 80 | 90 |
| 1 | 31 | 35[a] | 26 | 56 | 55[b] | 55 | 14 | 74[a] | 63[a] | 84 | 95 | 94[a] | 24 | 22 | 42 | 0 | | |
| 2 | 31 | 35[a] | 26 | 51 | 55[a] | 55 | 46 | 56 | 75 | 14 | 91 | 63 | 84 | | | 1 | | |
| 3 | 31 | 35[a] | 26 | 51 | 55[a] | 55 | 46 | 56 | 75 | 14 | 91 | 95[a] | 24 | | | 1 | | |
| 4 | 51 | 55[a] | 46 | 56 | 55 | 75 | 46[a] | 25 | 13 | 84 | 95 | 93 | 44 | | | 1 | | |
| 5 | 51 | 55[a] | 46 | 71 | 75 | 75 | 35[a] | 16 | 25 | 34 | 91 | 94 | 44 | 24 | 22 | 8 | | |
| 6 | 51 | 55 | 46 | 71 | 75 | 75 | 66[a] | 16 | 25 | 34 | 95 | 13 | 84 | 81 | 43 | 8 | | |
| 7 | 71 | 75 | 66 | 16 | 25 | 25 | 66[a] | 45 | 33 | 82 | 91 | 93 | 44 | 44 | 42[b] | 0 | | |
| 8 | 71 | 75 | 66 | 21 | 25 | 25 | 26 | 36 | 45 | 54 | 95 | 94 | 64 | 81 | 43 | 1 | | |
| 9 | 71 | 75 | 66 | 21 | 25 | 25 | 55 | 36 | 45 | 54 | 91 | 33 | 82 | 63[b] | 62 | 1 | SW | |
| 10 | 21 | 25 | 26 | 21 | 25 | 45 | 26 | 65 | 53 | 84[b] | 95 | 12 | 64 | 44 | 42[b] | 1 | | |
| 11 | 21 | 25 | 26 | 36 | 45 | 45 | 75 | 56 | 65 | 54 | 93 | 62 | 14 | 64 | 43 | 8 | | |
| 12 | 21 | 25 | 26 | 41 | 45 | 45 | 46 | 56 | 65 | 74[b] | 95 | 13 | 82 | 83 | 12 | 8 | | |
| 13 | 41 | 45 | 46 | 41 | 45 | 65 | 46 | 56 | 65 | 74[b] | 91 | 12 | 32 | | | 0 | | |
| 14 | 41 | 45 | 46 | 56 | 65 | 65 | 25 | 15 | 15 | 24 | 95 | 32 | 84 | 14 | 13 | 1 | | |
| 15 | 41 | 45 | 46 | 61 | 65 | 65 | 66 | 16 | 16 | 24 | 93 | 55 | 52 | 81 | 33 | 1 | SW | |
| 16 | 61 | 65 | 66 | 16[b] | 15 | 15 | 45 | 35 | 23[b] | 84 | 95 | 73 | 92 | 34 | 32 | 1 | | |
| 17 | 61 | 65 | 66 | 11[b] | 15 | 15 | 26 | 36 | 35[b] | 44 | 93 | 52 | 72 | 83 | 53 | 8 | | |
| 18 | 61 | 65 | 66 | 11[b] | 15 | 35 | 26 | 36 | 35[b] | 44 | 95 | 23 | 92 | 52 | 52 | 8 | | |
| 19 | 11[a] | 15 | 26 | 36 | 35[b] | 35 | 65 | 55 | 43[b] | 82 | 93 | 72 | 84 | 73 | 73 | 8 | | SW |
| 20 | 11[a] | 15 | 26 | 31 | 35[b] | 35 | 46 | 56 | 55[b] | 64 | 95[a] | 95 | 22 | 74[a] | 72 | 4 | | SW |
| 21 | 11[a] | 15 | 26 | 31 | 35[b] | 35 | 46 | 56 | 55[b] | 64 | 91 | 43 | 82 | 83 | 23 | 8 | | SW |

| PER. IOD | VALVE POSITION — OPEN | | | | | | | | | | | | | | | SWITCHOVER | | |
|---|---|---|---|---|---|---|---|---|---|---|---|---|---|---|---|---|---|---|
| | | | | | | | | | | | | | | | | 100[a] | 80 | 90 |
| 1 | 31 | 35[a] | 26 | 55[b] | 14 | 74[a] | 63[a] | 84 | 95 | 94[a] | 24 | 22 | 81 | | | 0 | | |
| 2 | 31 | 35[a] | 26 | 55[a] | 46 | 56 | 75 | 14 | 91 | 63[a] | 84 | 95 | 94 | 43 | 81 43 | 1 | | |
| 3 | 31 | 35[a] | 26 | 55[a] | 46 | 56 | 75 | 14 | 91 | 63[a] | 84 | 95 | 94 | 24 | 81 43 42 | 1 | | |
| 4 | 31 | 35[a] | 26 | 55[a] | 46 | 56 | 75 | 14 | 91 | 93 | 84 | 81 | 43 | 42 | | 1 | | |
| 5 | 31 | 35[a] | 26 | 55[a] | 46 | 56 | 75 | 13 | 91 | 93 | 24 | 81 | 22 | | | 1 | | |
| 6 | 51 | 55[a] | 46 | 75 | 25 | 13 | 91 | 93 | 44 | 42 | 81 | | | | | 1 | SW | |
| 7 | 51 | 55[a] | 46 | 75 | 16 | 25 | 34 | 95 | 94 | 42 | 81 | | | | | s | SW | |
| 8 | 51 | 55[a] | 46 | 75 | 16 | 25 | 34 | 95 | 94 | 44 | 81 | 63[a] | 62 | | | s | | |
| 9 | 51 | 55[a] | 46 | 75 | 16 | 25 | 34 | 95 | 94[b] | 44 | 81 | 63[b] | 62 | | | s | | |
| 10 | 51 | 55[a] | 46 | 75 | 16 | 25 | 34 | 95 | 94 | 44 | 81 | 63[b] | 62 | | | 0 | | SW |
| 11 | 71 | 75 | 66 | 25 | 55[a] | 45 | 33 | 82 | 95 | 63[b] | 62 | 83 | 13 | 12 | | 1 | | |
| 12 | 71 | 75 | 66 | 25 | 55[a] | 45 | 36 | 82 | 95 | 33 | 83 | 13 | 12 | | | 1 | | |
| 13 | 71 | 75 | 66 | 25 | 55[a] | 45 | 36 | 82 | 95 | 64 | 12 | 83 | 13 | 12 | | 1 | | |
| 14 | 71 | 75 | 66 | 25 | 55[a] | 45 | 36 | 82 | 95 | 64 | 12 | 83 | 13 | | | 1 | | |
| 15 | 71 | 75 | 66 | 25 | 55[a] | 45 | 36 | 82 | 95 | 64 | 12 | 83 | | | | 1 | | |
| 16 | 21 | 25 | 26 | 75 | 45 | 45 | 53 | 95 | 94 | 14 | 32 | 81 | | | | s | | SW |
| 17 | 21 | 25 | 46 | 75 | 45 | 53 | 83 | 92 | 95 | 14 | 32 | 81 | | | | s | | |
| 18 | 21 | 25 | 46 | 56 | 65 | 73[b] | 84 | 91 | 95 | 14 | 32 | 52 | 83 | 33 | 32 | s | | |
| 19 | 21 | 25 | 46 | 56 | 65 | 73[b] | 84 | 91 | 93 | 14 | 34 | 32 | 52 | 83 | 33 32 | s | | |
| 20 | 21 | 25 | 46 | 56 | 65 | 73[b] | 84 | 91 | 93 | 34 | 32 | 83 | 33 | | | s | | |
| 21 | 41 | 45 | 46 | 56 | 65 | 74[b] | 24 | 92 | 93 | 34 | 52 | 83 | 33 | | | 0 | | SW |
| 22 | 41 | 45 | 46 | 56 | 15 | 24 | 82 | 92 | 93 | 34 | 52 | 53 | 52 | | | 1 | | |
| 23 | 41 | 45 | 46 | 56 | 15 | 24 | 82 | 95 | 92 | 53 | 52 | 53 | 52 | | | 1 | | |
| 24 | 41 | 45 | 46 | 56 | 15 | 24 | 84 | 82 | 95 | 92 | 54 | 53 | 52 | | | 1 | | |
| 25 | 41 | 45 | 46 | 56 | 15 | 24 | 84 | 95 | 92 | 54 | 52 | 73 | 72 | | | 1 | | |
| 26 | 61 | 65 | 66 | 45 | 23 | 35[b] | 44 | 82 | 95 | 92 | 54 | 81 | 72 | | | s | | SW |
| 27 | 61 | 65 | 66 | 26 | 35[b] | 36 | 44 | 82 | 95 | 92 | 54 | 81 | 72 | | | s | | |
| 28 | 61 | 65 | 66 | 26 | 35[b] | 36 | 44 | 82 | 95 | 92 | 54 | 72 | 22 | | | s | | |
| 29 | 61 | 65 | 66 | 26 | 35[b] | 36 | 44 | 82 | 95 | 72 | 22 | 81 73 72 | | | | 0 | | SW |
| 30 | 61 | 65 | 66 | 26 | 35[b] | 36 | 55[b] | 82 | 95 | 72 | 22 | 81 73 72 | | | | 1 | | |
| 31 | 11[a] | 15 | 26 | 46 | 55[b] | 43 | 64 | 82 | 95 | 74[a] | 83 | 23 | 22 | | | 1 | | |
| 32 | 11[a] | 15 | 26 | 46 | 55[b] | 55[b] | 64 | 74[a] | 83 | 23 | 22 | | | | | 1 | | |
| 33 | 11[a] | 15 | 26 | 46 | 55[b] | 64 | 82 | 74[a] | 83 | 23 | 22 | | | | | 1 | | |
| 34 | 11[a] | 15 | 26 | 46 | 55[b] | 64 | 91 | 74[a] | 82 | 25 | 23 | 83 | 22 | | | s | | SW |
| 35 | 11[a] | 15 | 26 | 46 | 55[b] | 64 | 91 | 74[a] | 83 | 22 | 43 | 42 | | | | s | | |

| PERIOD | OPEN VALVES | | | | | | | | | | | | | | |
|---|---|---|---|---|---|---|---|---|---|---|---|---|---|---|---|
| 1  | 21 | 26 | 31 | 36 | 45 | 14 | 54 | 83 | 94 | 105 | 104 | 64 | 62 | 72 | | |
| 2  | 21 | 26 | 31 | 36 | 41 | 46 | 55 | 14 | 101 | 83 | 94 | 105 | 104 | 64 | 91 | 73 |
| 3  | 21 | 26 | 31 | 36 | 41 | 46 | 55 | 14 | 101 | 103 | 64 | 83 | 94 | 91 | 72 |
| 4  | 31 | 36 | 41 | 46 | 55 | 24 | 64 | 13 | 92 | 105 | 74 | 72 | 82 | 73 | 82 |
| 5  | 31 | 36 | 41 | 46 | 51 | 56 | 65 | 24 | 103 | 13 | 102 | 105 | 74 | 72 | 93 | 83 |
| 6  | 31 | 36 | 41 | 46 | 51 | 56 | 65 | 24 | 103 | 105 | 74 | 82 | 93 | 82 |
| 7  | 41 | 46 | 51 | 56 | 65 | 34 | 74 | 23 | 94 | 13 | 74 | 82 | 12 | 13 |
| 8  | 41 | 46 | 51 | 56 | 61 | 66 | 75 | 34 | 101 | 105 | 104 | 13 | 84 | 12 | 91 | 13 |
| 9  | 41 | 46 | 51 | 56 | 61 | 66 | 75 | 34 | 101 | 23 | 84 | 94 | 12 | 91 | 12 |
| 10 | 51 | 56 | 61 | 66 | 75 | 44 | 84 | 33 | 103 | 14 | 102 | 12 | 22 | 23 | 22 |
| 11 | 51 | 56 | 61 | 66 | 71 | 76 | 85 | 44 | 103 | 33 | 92 | 105 | 14 | 12 | 93 | 23 |
| 12 | 51 | 56 | 61 | 66 | 71 | 76 | 85 | 44 | 103 | 101 | 14 | 22 | 93 | 22 |
| 13 | 61 | 66 | 71 | 76 | 85 | 54 | 14 | 43 | 94 | 33 | 104 | 22 | 32 | 33 | 32 |
| 14 | 61 | 66 | 71 | 76 | 81 | 86 | 15 | 54 | 101 | 43 | 24 | 105 | 94 | 22 | 91 | 33 |
| 15 | 61 | 66 | 71 | 76 | 81 | 86 | 15 | 54 | 101 | 105 | 24 | 32 | 91 | 32 |
| 16 | 71 | 76 | 81 | 86 | 15 | 24 | 25 | 53 | 92 | 43 | 94 | 32 | 42 | 43 | 42 |
| 17 | 71 | 76 | 81 | 86 | 11 | 16 | 25 | 64 | 101 | 53 | 34 | 105 | 92 | 42 | 93 | 43 |
| 18 | 71 | 76 | 81 | 86 | 11 | 16 | 25 | 64 | 103 | 101 | 34 | 42 | 93 | 42 |
| 19 | 81 | 86 | 11 | 16 | 25 | 74 | 34 | 63 | 94 | 53 | 104 | 42 | 52 | 53 | 52 |
| 20 | 81 | 86 | 11 | 16 | 21 | 26 | 35 | 74 | 101 | 63 | 44 | 105 | 94 | 52 | 91 | 53 |
| 21 | 81 | 86 | 11 | 16 | 21 | 26 | 35 | 74 | 101 | 103 | 44 | 62 | 91 | 52 |
| 22 | 11 | 16 | 21 | 26 | 35 | 84 | 44 | 73 | 92 | 73 | 102 | 52 | 42 | 93 | 62 |
| 23 | 11 | 16 | 21 | 26 | 31 | 36 | 45 | 84 | 103 | 73 | 54 | 105 | 102 | 54 | 93 | 63 |
| 24 | 11 | 16 | 21 | 26 | 31 | 36 | 45 | 84 | 103 | 101 | 54 | 93 | 52 | 63 |

FIG. 9

| PER. IOD | VALVES POSITION OPEN | | | | | | | | | SWITCHOVER 84 103 | |
|---|---|---|---|---|---|---|---|---|---|---|---|
| 1  | 21 | 26 | 35 | 14 | 44 | 73 | 53[b] | 52 |    |    |    |
| 2  | 21 | 26 | 31 | 36 | 45 | 13 | 83[b] | 73 | 53[b] | 52 | sw |
| 3  | 21 | 26 | 31 | 36 | 45 | 73 | 53[b] | 52 | 12 |    |    |
| 4  | 31 | 36 | 45 | 24 | 54 | 93 | 13 | 12 |    |    | sw |
| 5  | 31 | 36 | 41 | 46 | 55 | 23 | 63 | 93 | 13 | 12 |    |
| 6  | 31 | 36 | 41 | 46[b] | 55 | 93 | 13 | 12 | 22 |    |    |
| 7  | 41 | 46 | 55 | 34[b] | 14 | 73 | 23 | 22 |    |    |    |
| 8  | 41 | 46 | 51 | 56 | 15 | 33 | 83 | 73 | 23 | 22 |    |
| 9  | 41 | 46 | 51 | 56 | 15 | 73 | 23 | 22 | 32 |    |    |
| 10 | 51 | 56 | 15 | 44 | 24 | 93 | 33 | 32 |    |    | sw |
| 11 | 51 | 56 | 11 | 16 | 25 | 43 | 63 | 93 | 33 | 32 |    |
| 12 | 51 | 56 | 11 | 16 | 25[a] | 93 | 33 | 32 | 42 |    |    |
| 13 | 11 | 16 | 25 | 54 | 34[a] | 73[a] | 43 | 42 |    |    | sw |
| 14 | 11 | 16 | 21 | 26 | 35 | 53[a] | 83 | 73 | 43 | 42 |    |
| 15 | 11 | 16 | 21 | 26 | 35 | 73 | 43 | 42 | 52 |    |    |

FIG. 12

| PER. IOD | OPEN VALVES | | | | | | | | | |
|---|---|---|---|---|---|---|---|---|---|---|
| 1a  | 21 | 26 | 35 | 13 | 43 | 73 | 54 | 52 |    |    |
| 2a  | 21 | 26 | 31 | 36 | 45 | 13 | 83 | 73 | 54 | 52 |
| 3a  | 21 | 26 | 31 | 36 | 45 | 73 | 54 | 52 | 12 |    |
| 4a  | 31 | 36 | 45 | 24 | 54 | 93 | 13 | 12 |    |    |
| 5a  | 31 | 36 | 41 | 46 | 55 | 24 | 63 | 93 | 13 | 12 |
| 6a  | 31 | 36 | 41 | 46 | 55 | 93 | 13 | 12 | 22 |    |
| 7a  | 41 | 46 | 55 | 33 | 13 | 73 | 24 | 22 |    |    |
| 8a  | 41 | 46 | 51 | 56 | 15 | 33 | 83 | 73 | 24 | 22 |
| 9a  | 41 | 46 | 51 | 56 | 15 | 73 | 24 | 22 | 32 |    |
| 10a | 51 | 56 | 15 | 44 | 24 | 93 | 33 | 32 |    |    |
| 11a | 51 | 56 | 11 | 16 | 25 | 44 | 63 | 93 | 33 | 32 |
| 12a | 51 | 56 | 11 | 16 | 25 | 93 | 33 | 32 | 42 |    |
| 13a | 11 | 16 | 25 | 53 | 33 | 73 | 44 | 42 |    |    |
| 14a | 11 | 16 | 21 | 26 | 35 | 53 | 83 | 73 | 44 | 42 |
| 15a | 11 | 16 | 21 | 26 | 35 | 73 | 44 | 42 | 52 |    |
| 1b  | 21 | 26 | 35 | 14 | 44 | 93 | 53 | 52 |    |    |
| 2b  | 21 | 26 | 31 | 36 | 45 | 14 | 63 | 93 | 53 | 52 |
| 3b  | 21 | 26 | 31 | 36 | 45 | 93 | 53 | 52 | 12 |    |
| 4b  | 31 | 36 | 45 | 23 | 53 | 73 | 14 | 12 |    |    |
| 5b  | 31 | 36 | 41 | 46 | 55 | 23 | 83 | 73 | 14 | 12 |
| 6b  | 31 | 36 | 41 | 46 | 55 | 73 | 14 | 12 | 22 |    |
| 7b  | 41 | 46 | 55 | 34 | 14 | 93 | 23 | 22 |    |    |
| 8b  | 41 | 46 | 51 | 56 | 15 | 34 | 63 | 93 | 23 | 22 |
| 9b  | 41 | 46 | 51 | 56 | 15 | 93 | 23 | 22 | 32 |    |
| 10b | 51 | 56 | 15 | 43 | 23 | 73 | 34 | 32 |    |    |
| 11b | 51 | 56 | 11 | 16 | 25 | 43 | 83 | 73 | 34 | 32 |
| 12b | 51 | 56 | 11 | 16 | 25 | 73 | 34 | 32 | 42 |    |
| 13b | 11 | 16 | 25 | 54 | 34 | 93 | 43 | 42 |    |    |
| 14b | 11 | 16 | 21 | 26 | 35 | 54 | 63 | 93 | 43 | 42 |
| 15b | 11 | 16 | 21 | 26 | 35 | 93 | 43 | 42 | 52 |    |

| PERIOD | VALVE POSITION — OPEN | | | | | | | | SWITCHOVER 60 |
|---|---|---|---|---|---|---|---|---|---|
| 1  | 21 | 25 | 14 | 61 | 62 | 64 | 34 |    | 42 SW |
| 2  | 21 | 25 | 64 | 34 | 51 | 13 | 54 | 43 | 42 |
| 3  | 21 | 25 | 64 | 34 | 51 | 13 | 53 | 43 |    |
| 4  | 31 | 35 | 24 | 62 | 61 | 63 | 44 |    | 12 SW |
| 5  | 31 | 35 | 63 | 44 | 53 | 23 | 52 | 13 | 12 |
| 6  | 31 | 35 | 63 | 44 | 53 | 23 | 51 | 13 |    |
| 7  | 41 | 45 | 34 | 62 | 61 | 63 | 14 |    | 22 SW |
| 8  | 41 | 45 | 63 | 14 | 54 | 33 | 54 | 23 | 22 |
| 9  | 41 | 45 | 63 | 14 | 51 | 33 | 53 | 23 |    |
| 10 | 11 | 15 | 44 | 61 | 62 | 64 | 24 |    | 32 SW |
| 11 | 11 | 15 | 64 | 24 | 53 | 43 | 52 | 33 | 32 |
| 12 | 11 | 15 | 64 | 24 | 53 | 43 | 51 | 33 |    |

FIG. 19

| PERIOD | OPEN VALVES | | | | | | |
|---|---|---|---|---|---|---|---|
| 1  | 21 | 25 | 14 | 34 | 42 |    | 42 |
| 2  | 21 | 25 | 34 | 13 | 51 | 54 | 43 |
| 3  | 21 | 25 | 34 | 13 | 51 | 53 | 43 |
| 4  | 31 | 35 | 24 | 44 | 12 |    | 12 |
| 5  | 31 | 35 | 44 | 23 | 53 | 52 | 13 |
| 6  | 31 | 35 | 44 | 23 | 53 | 51 | 13 |
| 7  | 41 | 45 | 14 | 34 | 22 |    | 22 |
| 8  | 41 | 45 | 34 | 14 | 51 | 54 | 23 |
| 9  | 41 | 45 | 34 | 14 | 51 | 53 | 23 |
| 10 | 11 | 15 | 24 | 44 | 32 |    | 32 |
| 11 | 11 | 15 | 44 | 24 | 53 | 52 | 33 |
| 12 | 11 | 15 | 44 | 24 | 53 | 51 | 33 |

FIG. 22

| PERIOD | VALVE POSITION — OPEN | | | | | | SWITCHOVER 40 |
|---|---|---|---|---|---|---|---|
| 1 | 11 | 15 | 33 | 41 | 43 | 24 |    |
| 2 | 11 | 15 | 24 | 32 |    |    | SW |
| 3 | 11 | 15 | 24 | 42 | 33 | 32 |    |
| 4 | 21 | 25 | 13 | 41 | 43 | 34 |    |
| 5 | 21 | 25 | 34 | 12 |    |    | SW |
| 6 | 21 | 25 | 34 | 42 | 33 | 14 |    |
| 7 | 31 | 35 | 23 | 41 | 43 | 14 |    |
| 8 | 31 | 35 | 14 | 22 |    |    | SW |
| 9 | 31 | 35 | 14 | 42 | 23 | 22 |    |

PROCESS AND APPARATUS FOR SEPARATING GASEOUS COMPONENT FROM A MIXTURE

The invention relates to processes and apparatuses for separation of gaseous components by means of selective and adiabatic adsorption and desorption of usually considered unwanted impurities, using suitable adsorbents.

Many different systems have been described in the patent literature, all characterized by the general feature that removal of impurities from a gaseous mixture is effected through adsorption of these impurities by an adsorbent, followed by desorption and adsorbent regeneration by pressure relief and purging at low pressure with either much less contaminated or practically pure gas.

After repressurization with product quality gas, the regenerated adsorption zone is ready to undergo a new adsorption step at high pressure.

For a continuous operation it is required that a multitude of adsorption zones be used, such that always at least one of these adsorption zones is used for adsorbing impurities from feed gas, while the remaining zones are regenerated.

The prior art processes give a low efficiency with respect to product recovery. For this there are two important reasons. The first reason is due to the fact that product gas is still present in the void volume of each adsorption zone during pressure relief and therefore during expansion of the gaseous phase in the void volume of this zone via its inlet, whereby this part of the product gas in admixture with desorbed components is discarded as waste gas. The second reason is due to the use of product quality gas for purging an adsorption zone from its outlet to its inlet for its regeneration, whereby in a similar way used purge gas is discarded as waste gas via the inlet.

According to the invention these objections now are removed.

In order to reduce the loss of product during expansion of the void space gas via the inlet of adsorption zones, an important part of this gas is recovered as product quality gas by first allowing this expansion to take place via the outlet, while the inlet of the adsorption zone is closed.

The adsorbable components which are present in an adsorption zone are distributed between the gaseous phase and the solid phase under equilibrium or heat equilibrium condition and have a partial pressure which remains largely unchanged during expansion of the void space gas via the outlet, due to such equilibrium and due to the fact that most of the adsorbable components are present in the solid phase.

During expansion of the void space gas via the outlet, the shape of the adsorption fronts will remain rather unchanged at least initially, when these move along with the gas flow towards the outlet, whereby especially due to their mostly unchanged partial pressures the volumetric content of the adsorbable components increases accordingly. As long as said adsorption fronts remain in the adsorption zone and do not break through, the recovered void space gas is of product quality.

The first adsorption front breaking through will consist of less strongly adsorbed component, while the pressure at which such breakthrough occurs depends on its relative position between inlet and outlet at the moment that such expansion starts. In case this position is at a large distance from the outlet, a larger quantity of product quality gas can be recovered. In that case however it means that a larger part of the adsorption zone is not used during adsorption but in stead serves for the recovery of product quality gas during expansion of void space gas via the outlet.

While on the one hand most of the adsorption zone preferably should be utilized during an adsorption step, the amount of product quality gas, recovered during expansion of void space gas via the outlet should on the other hand also be as large as possible, while this recovered gas will be used firstly for repressurizing regenerated adsorption zones, secondly and at last for purging. Any major breakthrough of an adsorption front would therefore cause a progressive contamination of purge gas, making it less effective as regenerant.

Unexpectedly, it has been found and as such has been made one of the subjects of this invention, that a major breakthrough of at least one adsorption front during expansion of void space gas via the outlet is allowed to take place, provided special measures are taken aimed at a programmed reuse of the recovered and in this case partly contaminated gas for repressurization and for purging. Programmed reuse of the recovered gas means that its fraction being mostly contaminated and with the highest content of unwanted components is used as the first part of gas for purging. While purging is progressing, the concentration of unwanted components in the purge gas gradually reduces in accordance with the way by which this concentration increased during the expansion of void space gas via the outlet and therefore during the recovery of this purge gas.

Since any impurities concentration in the expanded gas will tend to increase while being recovered, reuse of this gas, also for as far as it serves to repressurize regenerated adsorption zones preferably via their outlets, can be programmed similarly to the way by which purge gas is programmed for reuse, i.e. reuse of expanded gas for repressurization, while any impurity concentration in it gradually reduces in accordance with the way by which said concentration increased during its recovery.

The most effectively programmed reuse of expanded void space gas as described concerns the reuse of purge gas, being the gas of which the last part during its recovery has the highest impurity concentration and which therefore in accordance with the invention at the very start of each purge step is introduced into a depressurized adsorption zone via its outlet, thereby depositing said impurities at the maximum possible distance from the outlet. As a result of said programmed reuse, the quality of the first part of purge gas matches the prevailing condition at the outlet of the adsorption zone to be purged, the latter having released this first part as the last fraction, only at some higher pressure. This is contrary to the usual practice, where purge gas is immediately used during its recovery and the position of its composition or quality profile from recovery to use as purge gas is reversed, in effect meaning that the last part of this purge gas has the highest impurity concentration instead of the lowest, and that therefore the level of that highest impurity concentration should be closely watched and of low level if a high purity product is wanted. For the process according to this invention, which in effect avoids such reversal, and therefore features the nonreversed reuse of recovered void space gas, such low level of the highest impurity concentration is not necessary and during expansion of void space gas via the outlet for the recovery of purge gas, substantial breakthrough of adsorption fronts can be allowed, ultimately leaving less non-adsorbable product in the void space at the end of the void space gas recovery and therefore reducing the amount of product which is lost on expansion of void space gas via the inlet. Having allowed such a substantial breakthrough means that impurities thus recovered with the purge gas will be actively involved during the purge step to desorb more adsorbable components partly through substitution, due to the affinity of the substituting component to the adsorbent, altogether making the purge gas more effective.

Although it would be possible to realize such non reversed reuse of recovered void space gas by approximation, using several steps for such reuse, for repressurization as well as for purging, a large number of adsorption zones would be required in order to accept for each adsorption zone fragments one after the other such that quality profile reversal would only apply for each fragment. Theoretically quality profile reversal on reuse of recovered gas would be completely eliminated when using an infinite number of adsorption zones and gas fragments.

Surprisingly it has been found and as such is considered part of this invention, that quality reversal on reuse of recovered gas for repressurization as well as for purging can be completely eliminated, without requiring a larger number of adsorption zones, by applying packed columns through which alternatingly reversed in two possible directions, recovered void space gas is sent before its reuse.

The packed columns are taken up in the flow of gas which results from the release of void space gas via the outlet of an adsorption zone and the reuse of gas again via the outlet of another adsorption zone for its repressurization and/or its purging.

The gas actually being used for repressurization or purging is released by the relevant packed column via a first nozzle, being substituted and driven out by recovered void space gas which is introduced via a second nozzle at a location opposite to the first. By reversing the gas flow through the packed column any time a new void space gas recovery and reuse is initiated, it is made certain that the last part of void space gas being recovered will be the first part when reused for repressurization or purging, thereby achieving complete or nearly complete elimination of its quality profile reversal.

The packed column acts as an intermediate holdup space for recovered void space gas before reuse, whereby the packing serves to avoid backmixing and to maintain plug flow, such that the quality profile of the gas is preserved. The packing should preferably be nonporous and should have a high void fraction, a condition which is met by using thin walled metallic Raschig rings.

Packed columns may have different configurations. In order to suppress axial mixing of the gas sent through it, one or more internal baffles may be used, thereby increasing the path length which the gas has to follow between two opposing nozzles in the column. A preferred configuration is constituted by a cylindrical baffle placed in a coaxial position in a vertical column and being gas tight attached onto the lower bottom of this column.

The invention may be more clearly understood by reference to the accompanying drawings.

FIGS. 3, 5, 8, 9, 11, 16 and 21 show time versus pressure diagrams for the various apparatuses of FIGS. 2, 7, 10, 13, 15, 18 and 20, respectively.

FIGS. 4, 6, 12, 14, 17, 19 and 22 give a table of the periods during which various valves in the apparatuses of FIGS. 2, 7, 10, 13, 15, 18 and 20 are opened. Valves which have not been indicated in these tables are open during the full run.

Figure 2:
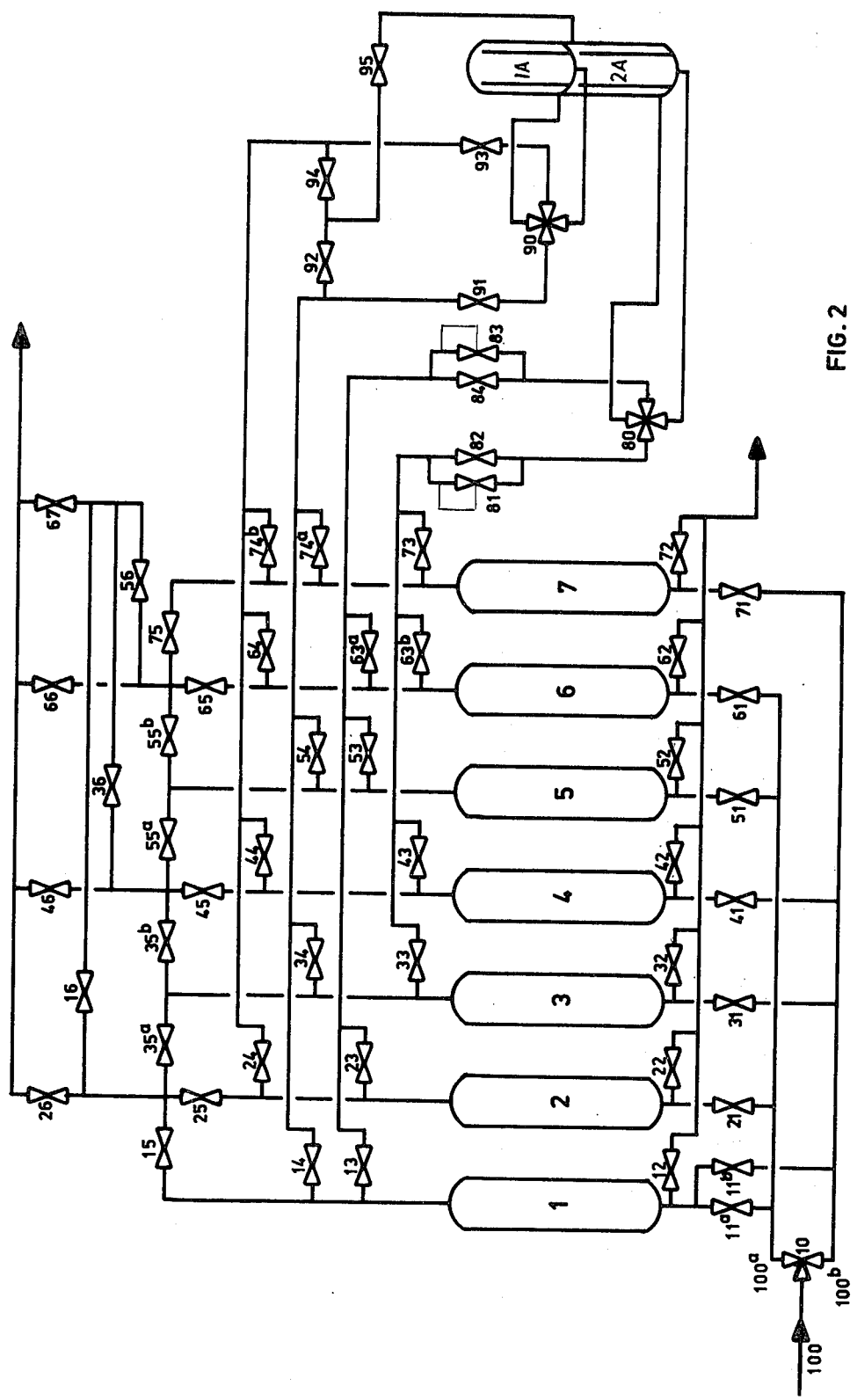
FIGS. 2, 7, 10, 13, 15, 18 and 20 show schematically a flow sheet of various embodiments of an apparatus for the separation (purification) of a gas stream.
Figure 3:
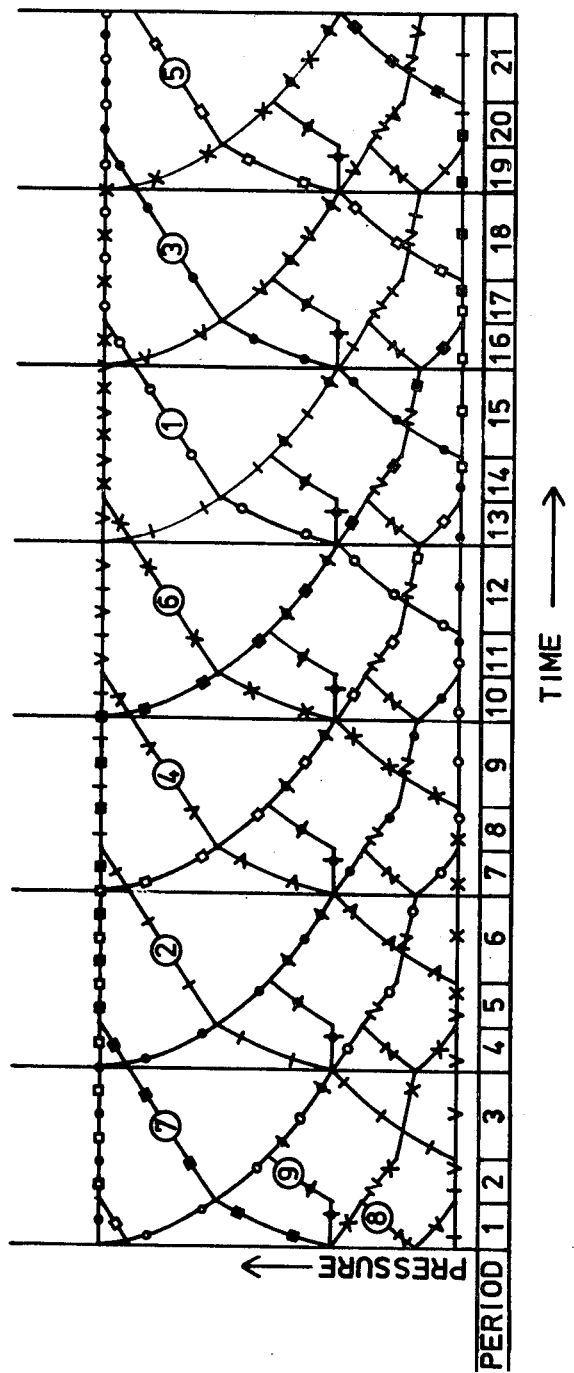
Figure 5:
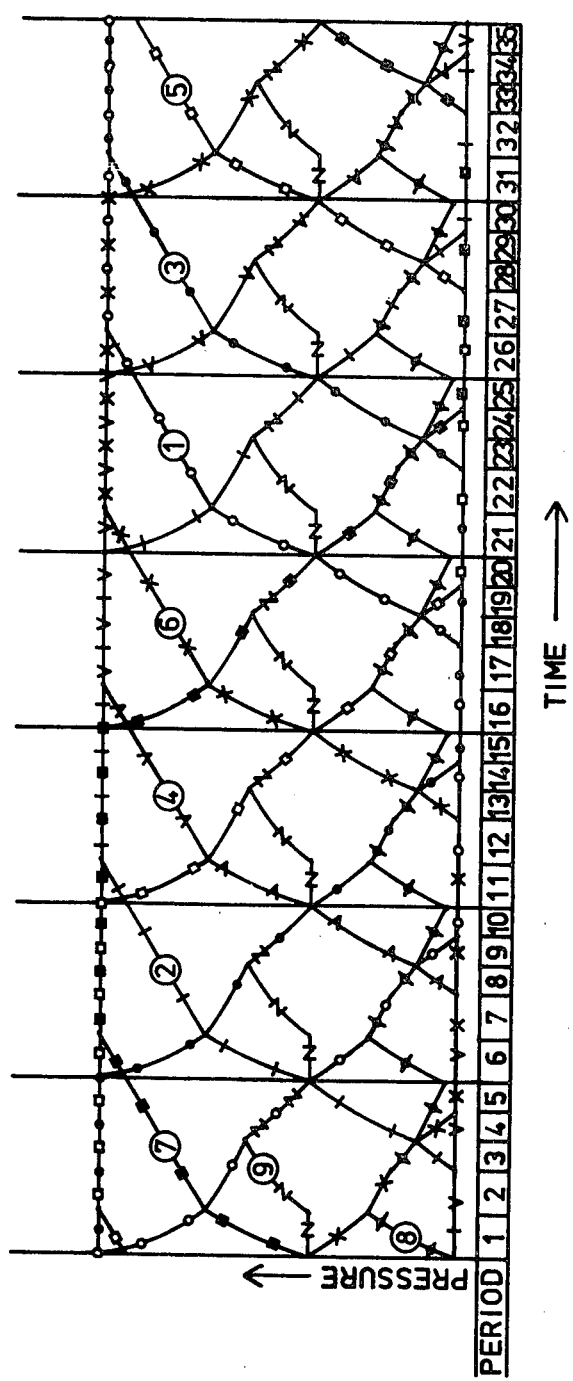

FIGS. 3 and 4 illustrate one use of the apparatus of FIG. 2. FIGS. 5 and 6 illustrate a second use of the illustration of FIG. 2. FIGS. 16 and 17 illustrate a use of the apparatus of FIG. 15.

Figure 18:
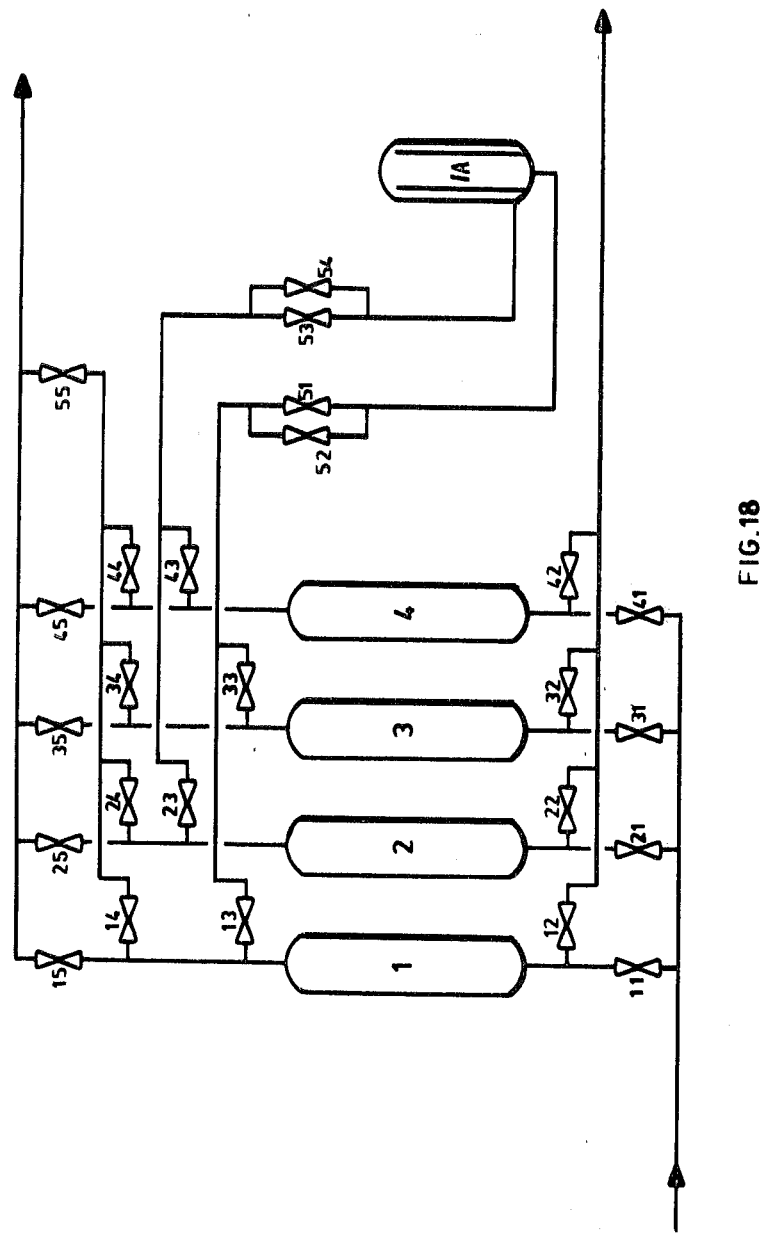

FIG. 16, together with FIG. 19, illustrates a use of the apparatus of FIG. 18.

Figure 1:
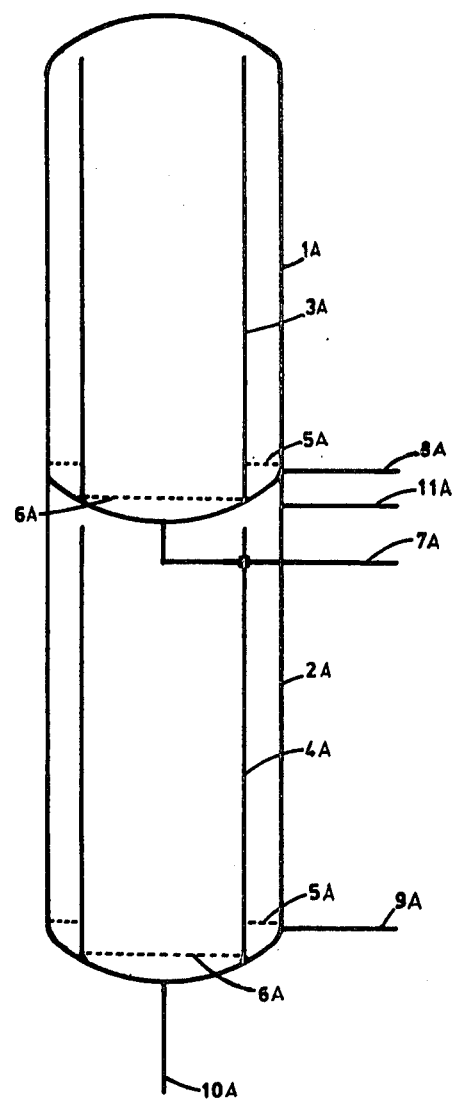
FIG. 1 shows an apparatus employing the invention, the apparatus having two packed columns in a single vertical shell.

In case two columns are used, an attractive alternative could consist of a combination of two columns in a single vertical shell as shown by FIG. 1. Each of the columns 1A and 2A has been provided with cylindrical baffles 3A and 4A in a coaxial position, while the total volume has been filled with a packing which is supported by the grids 5A and 6A.

Gas flows by being introduced via conduit 7A and grid 6A through the central core of the cylindrical baffle 3A. The gas flows upwards and back downwards through the annular space between the outershell of column 1A and the cylindrical baffle 3A via grid 5A and conduit 8A. This flow, again and again, is reversed in opposite directions when a new charge of recovered void space gas is introduced.

Column 2A operates in an exactly analogous way whereby, alternatingly, gas is supplied and released via conduits 9A and 10A. The gas thus flows through conduits 9A via grid 5A and through the annular space between the outershell of column 2A and the cylindrical baffle 4A, downwards through the central core of cylindrical baffle 4A via grid 10A, and finally through the conduit 10A, or in a direction which is opposite to this. As the need arises, intermediate fractions of gas can be withdrawn through conduit 11A.

Apart from being essential for a nonreversed reuse of recovered void space gas, the packed columns in addition serve as means to control the quantity of recovered gas being accumulated while therefore this gas may already be allowed to become available without the actual reuse taking place for repressurization or otherwise in the case of reuse as purge gas, purging is made possible to continue through further release of gas by a packed column, also when the admission of recovered void space gas to said column has already been terminated.

In this way, when reusing recovered gas for repressurization, its actual recovery from expansion of void space gas has been allowed to start earlier, such that gas velocities, being more critical during said recovery, for allowing sufficiently near approaches to adsorption equilibria, are kept low enough and continuous. As for the purging step the extended availability and use of purge gas is very helpful for an efficient regeneration.

Another important aspect concerns the amount of adsorbent per adsorption zone and the number of adsorption zones that are required for a given gas purification. The effective utilization of adsorbent is or prime concern, which means that the mass transfer zones in which the actual adsorption takes place and in which therefore the adsorbent has not achieved its maximum loading, should be an as small as possible a fraction of the adsorption zone at the end of an adsorption step. The latter means that, during adsorption, gas velocities should be maintained which avoid large differences between actual and equilibrium concentrations.

Large gas velocities cause, due to the relative slowness for establishing adsorption equilibria, larger mass transfer zones such that these ultimately would constitute a larger fraction of the total adsorption zone. While in addition the amount of purge gas being required for regeneration would be unfavourably affected for large approaches to adsorption equilibria and also adsorption steps should be terminated at some earlier moment to avoid premature breakthrough of adsorption fronts during subsequent recovery of void space gas, a moderate gas velocity during adsorption should therefore be maintained as per common practice for an effective utilization of adsorbent and for achieving acceptable yields of wanted product.

Unfortunately however, small mass transfer zones means that while adsorption proceeds, a large part of the adsorbent does not actively take part in the adsorption as such, but merely serves as a storage medium for adsorbed components.

Unexpectedly and contrary to the usual practice it has been found, and as such is considered part of this invention, that a more effective utilization of adsorbent is still possible at higher gas velocities, provided a lower gas velocity is used during some last part of an adsorption step.

By initially using a higher and towards the end of an adsorption step a lower gas velocity, initial mass transfer zones will be relatively large, until, on reducing the gas velocity, their sizes will be reduced consistently with the actual gas velocity. This method offers therefore the possibility to utilize adsorbent more effectively as adsorbent instead of as a storage medium, despite a higher average gas velocity and thus a shorter adsorption time.

Where the adsorption time may be reduced by using variable gas velocities, the time required for adsorbent regeneration through purging cannot be reduced without affecting the regeneration unfavourably and without a gradual reduction of effective adsorbent capacity.

Consequently as an important conclusion of this invention it has been found, that while through the use of packed columns, apart from their function of eliminating reversal of quality profiles of recovered void space gas before reuse, the relative time spent for purging can be increased whereas consequently the relatively shorter time left available for adsorption can be effectively utilized by increasing the average gas velocity in the relevant adsorption zones, provided that such velocity during at least about the last third part of the adsorption step is kept sufficiently low for achieving a best possible adsorbent loading.

A fluctuating feed and product stream which would result from a variable gas velocity is avoided by allowing at least two adsorption zones to act as actual adsorbers, either always, or on occasion simultaneously, in any case such that when in one adsorption zone a lower gas velocity is used, at least one other adsorption zone acts as an actual adsorber in parallel. In the latter adsorption zone in case this does not undergo the last part of an adsorption step, a higher gas velocity may be used in order to achieve the aim of a constant feed and product stream.

Part of the effective reuse of gas recovered from expansion of void space gas via the outlet of an adsorption zone concerns the repressurization of another regenerated adsorption zone by admitting said recovered gas via its outlet until pressure equalization is attained. Final repressurization always takes place by means of high pressure product gas. However since the final product flow rate should preferably be kept constant, the product slipstream which is used for final repressurization should consequently be withdrawn at a constant rate, also when no such final repressurization is needed.

In the latter case said product slipstream is usually combined with recovered void space gas which in turn is used for repressurization until equalization of pressures. However due to the extra gas added by the product slipstream the pressure at which equalization of pressures is attained will be at a higher level, which means that the product slipstream has interfered with the gas exchange between a loaded and a regenerated adsorption zone whereas such gas exchange is intended for achieving an efficient reuse of recovered void space gas for repressurization. Therefore by introducing the product slipstream with said gas exchange, as per common practice the efficient reuse of recovered void space gas is adversely affected.

Now, in accordance with one important aspect of this invention concerning the use of variable gas velocities during adsorption, the utilization of recovered void space gas and product slipstream for repressurization does not need to be simultaneous anymore, which consequently allows said pressure equalizations to be established at lower pressure levels altogether increasing the efficient use of recovered void space gas.

This procedure is made possible in case of at least two adsorption zones which for some period operate in parallel as adsorbers. However during a shorter period of time the number of actively operating adsorption zones is reduced by one, while the moment at which another adsorption zone could start an adsorption step is delayed. It is this latter adsorption zone which instead of being put into adsorption service is made to continue accepting the product slipstream for repressurization while simultaneously the adsorption zone which has been removed from active adsorption duty releases gas by expansion of void space gas via its outlet, whereby this gas is directly used for repressurization of another regenerated adsorption zone until pressure equalization, now without interference by the product slip stream. During the time that a reduced number of adsorption zones are actively engaged as adsorbers, the gas velocity through these is increased for maintaining a constant feed and product flow rate.

Due to the non-reversed reuse of recovered void space gas, fractionation of this gas during and because of its expansion via the adsorption zone outlet is preserved and not spoiled, which especially contributes in achieving an improved separation efficiency, for instance for the recovery of gas mixtures, thereby achieving an improved separation of different adsorbable components. In this respect the processes may be used to recover pure mixtures of hydrogen and nitrogen from a variety of feed gases containing in addition such impurities like methane and other hydrocarbons, carbon monoxide, carbon dioxide, water vapour etc. Similarly pure mixtures of hydrogen and carbon monoxide may be produced In comparison to the recovery of pure hydrogen very high hydrogen recoveries can be realized if hydrogen is recovered in admixture with another gas like nitrogen or carbon monoxide. This is explained by the fact that the first component after hydrogen (nitrogen or carbon monoxide) is allowed to break through the adsorption zone outlet during the adsorption step, and while during the subsequent recovery of void space gas and the non-reversed reuse of this gas for purging, the hydrogen concentration especially in the first fraction of the purge gas is at its lowest level. The amount of hydrogen which is used in this way for purging is correspondingly lower for the benefit of its increased net recovery. For repressurization, recovered void space gas is used of higher hydrogen concentration subsequently followed by the use the product slip stream of product quality being consistent with a certain concentration of said first component in the final product.

By way of the following examples different possible embodiments of the invention are explained.

EXAMPLE 1

The variant explained in this example is preferably considered for larger capacities and combines all aspects of this invention. It consists of two packed columns being combined in one shell, and of seven adsorption zones which alternatingly maintain one and two adsorption zones in active adsorbing duty and whereby three different gas velocities for adsorption are used.

FIG. 2 shows schematically the installation consisting of adsorption zones 1 through 7 and two packed columns 1A and 2A arranged in one single shell.

The installation includes a feed gas line, two product lines, and interconnection piping. The feed gas is diverted by an automatic, three-way control valve 10 to conduits 100a and 100b, and is then introduced to one of two of the adsorption zones 1 through 7 via one or two of the automatic valves 11a, 11b, 21, 31, 41, 51, 61 or 71, with the product being discharged from adsorption zone 1 via valves 15 and 26, from adsorption zone 2 via valves 25 and 26, from adsorption zone 3 via valves 35a and 26 or 35b and 46, from adsorption zone 4 via valves 45 and 46, from adsorption zone 5 via valves 55a and 46, from adsorption zone 6 via valves 65 and 66, and from adsorption zone 7 via valves 75 and 66.

The amount of feed gas introduced into the conduits 100a, 100b is dependent on the point of time each of the conduits 100a and 100b handles a fixed fraction of the total stream or its complement. The fraction could be for instance: 0, 1, 0.6, respectively 0.4 or for instance: 0, 1, 0.7 respectively 0.3 etc. From the connection made between the adsorption zones and the conduits 100a and 100b it follows, that the desired ratio's of gas velocities over 1 or 2 adsorption zones can be set through control valve 10.

For a clear understanding of the operation of this unit, reference is made to FIGS. 3 and 4.

FIG. 3 presents a time versus pressure diagram, showing the pressure in each adsorption zone and packed column on the ordinate versus time on the abscissa by means of correspondingly identified lines. Time is subdivided into 7 times 3 periods for completion of a total cycle in 21 periods as indicated.

In FIG. 4 it is indicated which valves have been opened, except control valve 67 which controls the product slipstream used for the last phase of repressurizing regenerated adsorption zones.

For control valve 10 it is indicated what fraction of the total feed is diverted to conduit 100a, expressed by 0, 1, l or s in accordance with the size of this fraction being either zero, one, large or small. At any time the complement of said fraction is diverted to conduit 100b.

The fourway valves 80 and 90 serve to reverse the direction of gas flows in the packed columns 1A and 2A when needed. The moment at which valves 80 and 90 should be switched over, is indicated in FIG. 4 by: "SW".

As indicated by FIGS. 3 and 4, some time elapses between stop and start of two succeeding adsorption steps. It is for instance in such in-between period 1 that only adsorption zone 3 receives the total gas stream, simultaneously with a pressure equalization step, which reuses void space gas recovered from adsorption zone 1 via its outlet in a first instant for a second phase repressurization of adsorption zone 7 via its outlet.

The pressure equalization step in this way is not affected by the product slipstream, which during this same period 1 is used solely for a third phase and final repressurization of adsorption zone 5, for which therefore the start of a new adsorption step has been delayed.

During the last part of an adsorption step, the total gas stream is always distributed over two adsorption zones operating in parallel, such that the lowest gas velocity is used in the adsorption zone which as first will be taken out of service, thus achieving a best possible adsorbent loading in this adsorption zone, despite an initially high gas velocity.

During period 2, void space gas which is recovered in a second instant of depressurization via the outlet of adsorption zone 1, is introduced in packed column 1A until pressure equalization, without already being reused for repressurization and thus allowing the void spaced gas recovery to continue without interruption and avoiding high gas velocities.

After the pressure in packed column 1A has risen in period 2, actual reuse of the accumulated gas takes place in period 3 for the first phase repressurization of adsorption zone 2, while continuing gas recovery from adsorption zone 1 via column 1A until pressure equalization is achieved.

During periods 4, 5 and 6, further void space gas recovery takes place via the outlet of adsorption zone 1 in a third and last instant. The recovered gas is supplied to packed column 2A, while from an intermediate outlet and via control valve 95 gas of initially average quality is withdrawn for the purpose of purging adsorption zone 4 via valves 94, 44 and 42. Since during period 4 only one adsorption zone is purged, the pressure in column 8 rises until equalization. This changes when proceeding to period 5, when in addition adsorption zone 6 is purged via selector valve 80, control valve 81 and valves 63b and 62. Meanwhile the purity of gas withdrawn from column 8 for purging adsorption zone 4 gradually increases through substitution by void space gas which was recovered from adsorption zone 1 during period 4. During period 6, only adsorption zone 6 is purged as during period 5. At the end of period 6, the void space gas recovery from adsorption zone 1 is terminated, followed by further depressurization to the lowest pressure during period 7 when gas is released through its inlet and valve 12 to exhaust.

Proceeding to periods 8 and 9, adsorption zone 1 is purged at the lowest pressure by nonreversed reuse of void space gas recovered during preceeding periods 6 and 5 and now being supplied via valves 83 and 13. Used purge gas containing desorbed components is discarded to exhaust via valve 12. Purging is continued during periods 10 and 11 by purge gas now being withdrawn from column 8 via control valve 95 and valves 92 and 14. On proceeding to period 12, adsorption zone 1 is no longer purged but instead is repressurized in a first phase by the nonreversed reuse of gas, recovered mainly from adsorption zone 5 during preceeding periods 9 and 8 and now being substituted in column 9 by void space gas recovered from adsorption zone 7 during this and preceeding period 11.

On equalization of pressures in adsorption zones 1 and 7 and intermediate column 9, adsorption zone 1 is further repressurized in period 13 by void space gas recovered from adsorption zone 2 until pressure equalization. During the following periods 14, 15 and 16 a third phase and final repressurization takes place by means of the product slip stream via valves 16 and 15.

For the adsorption step during the periods 17 through 21 the gas velocity in adsorption zone 1 is varied complementary to the velocity used in adsorption zones 6 and 3 during the periods 17 and 18, and respectively 20 and 21. During period 19 the maximum gas velocity is used.

In table 1 an example is given of the gas velocities used in each adsorption zone expressed in cm/s, based on empty adsorption vessels, of each period of a complete cycle.

of adsorption zone 4 is continued, leading to a faster pressure drop in column 2A.

Independent of the latter variant, however in a similar fashion advancing the start of depressurization via the inlet of adsorption zones, it is possible, after closure of for instance valve 22 on finishing the purging of adsorption zone 2 at the end of period 2, to withdraw still some more gas from column 2A, via valves 95, 94 and 24 for an initial first phase repressurization of adsorption zone 2. After pressure equalization the first phase repressurization is continued like during the original period 3 by gas from column 1A.

Application of this variant is attractive in cases that more purge gas is available than strictly necessary. Instead of using such excess for purging it can partly or completely be utilized for repressurization like explained by the following example.

EXAMPLE 2

This example concerns a combination of an advanced start of depressurization via the inlet and the nonreversed reuse of recovered void space gas for repressurization of a freshly regenerated adsorption zone via packed column 2A. Using the same installation as in example 1 (FIG. 2) the operation is explained by means

TABLE 1

Adsorption Gas Velocities number of period in the cycle

| nr. adsorption zone | 1 | 2-3 | 4 | 5-6 | 7 | 8-9 | 10 | 11-12 | 13 | 14-15 | 16 | 17-18 | 19 | 20-21 |
|---|---|---|---|---|---|---|---|---|---|---|---|---|---|---|
| 3 | 12 | 4 | | | | | | | | | | | | |
| 5 | | 8 | 12 | 4 | | | | | | | | | | |
| 7 | | | | 8 | 12 | 4 | | | | | | | | |
| 2 | | | | | | 8 | 12 | 4 | | | | | | |
| 4 | | | | | | | | 8 | 12 | 4 | | | | |
| 6 | | | | | | | | | | 8 | 12 | 4 | | |
| 1 | | | | | | | | | | | | 8 | 12 | 4 |
| fraction of feed in conduit 100$^a$ | 0 | ¾ | 1 | ¼ | 0 | ¾ | 1 | ¼ | 0 | ¾ | 1 | ¼ | 1 | ¼ |

The relevant fraction of the total feed gas being sent through conduit 100a is also given. It appears that for each adsorption zone during an adsorption step the gas velocity from initially 8 cm/s increases to 12 cm/s and finally drops to 4 cm/s. The total of gas velocities during each period and as if related to one adsorption zone, is always constant at 12 cm/s, being a necessity for a constant flow of feed gas and product gas.

For adsorption processes not using variable gas velocities in adsorption zones, like for instance 4 cm/s, always three adsorption zones should be kept in active service for arriving at the same total of gas velocities of 12 cm/s, consistent with the same total gasflow.

Other velocities as indicated in table 1 which could be used, are for instance 9, 12 and 3 cm/s for the same total gas flow. The fraction of total feed gas being sent through conduit 100a would become respectively: 0, ¾, 1, ¼, 0, ¾, 1, ¼, 0, ¾, 1, ¼, 1 and ¼.

If required for a more effective regeneration, the time spent for purging may be increased by advancing the start of depressurization via the inlet of adsorption zones at the expense of the last part of void space gas recovery in a third and last instant. This means that for instance adsorption zone 6, in addition to the periods 5 through 8 already will be purged during period 4. Depressurization via the inlet then takes place during the last part of period 3. Valves 63a and 84 will then be closed, while valve 62 will be open. Meanwhile purging of a modified time/pressure diagram shown by FIG. 5 and a modified valve switching program, shown by FIG. 6.

Comparing the modified with the original time/pressure diagram (FIG. 5 versus FIG. 3) shows that the last part void space gas recovery in a third instant is accelerated during the initial part of a first phase repressurization to the benefit of an advanced start of depressurization via the inlet and of purging.

For the same duration of a total cycle and of each adsorption step, the time spent for purging is increased by about 33%.

Following the same principles an analogous result can be obtained by using 8 adsorption zones, with the most significant difference that the highest gas velocity in an adsorption zone can be lower. The average gas velocity will be lower as well.

A description of this variant is given with the following example.

EXAMPLE 3

Figure 7:
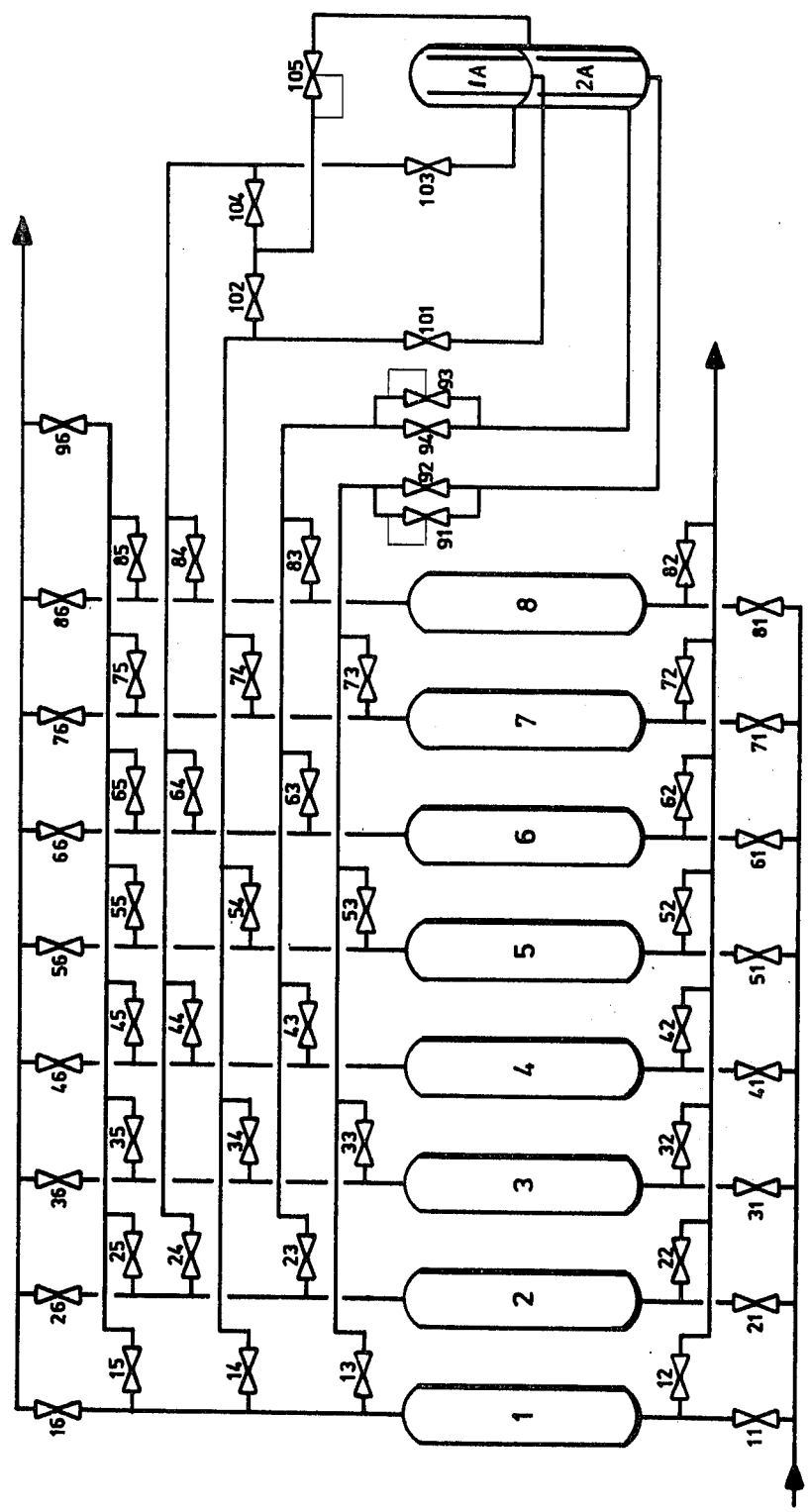

In FIG. 7, the scheme is shown of the installation consisting of eight adsorption zones 1 through 8 and two packed columns 2A and 1A arranged in a single shell.

Figure 8:
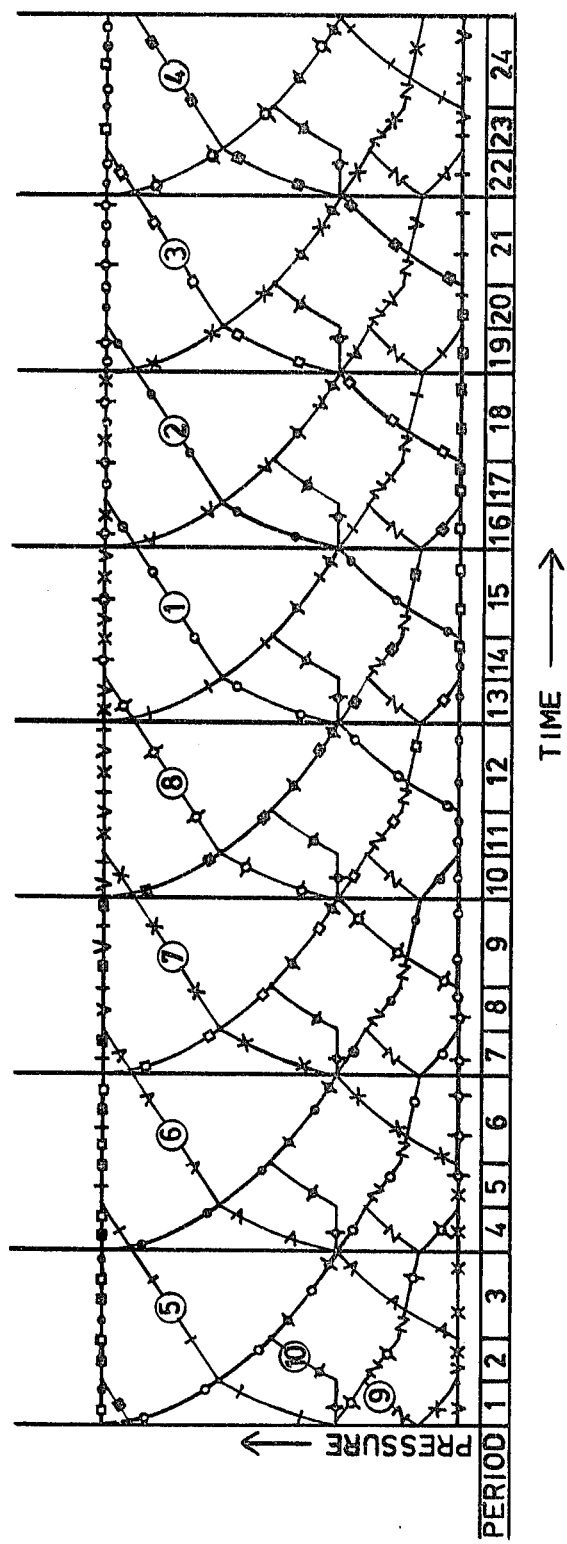

The number of adsorption zones which in parallel arragement, are at any time in adsorbing duty amounts to either 2 or 3 as shown by the time/pressure diagram of FIG. 8.

In FIG. 9 it is shown which valves are open with exception of control valve 96, which constantly controls the product slipstream, used for a third phase or last repressurization of adsorption zones.

In table 2 an example is given of prevailing gas velocities in cm/s for each period of a complete cycle. In comparison to table 1, applicable for seven adsorption zones, it is shown that for the same capacity, which is apparent because of the same total of gas velocities (12 cm/s), the maximum velocity is 50% lower.

Figure 11:
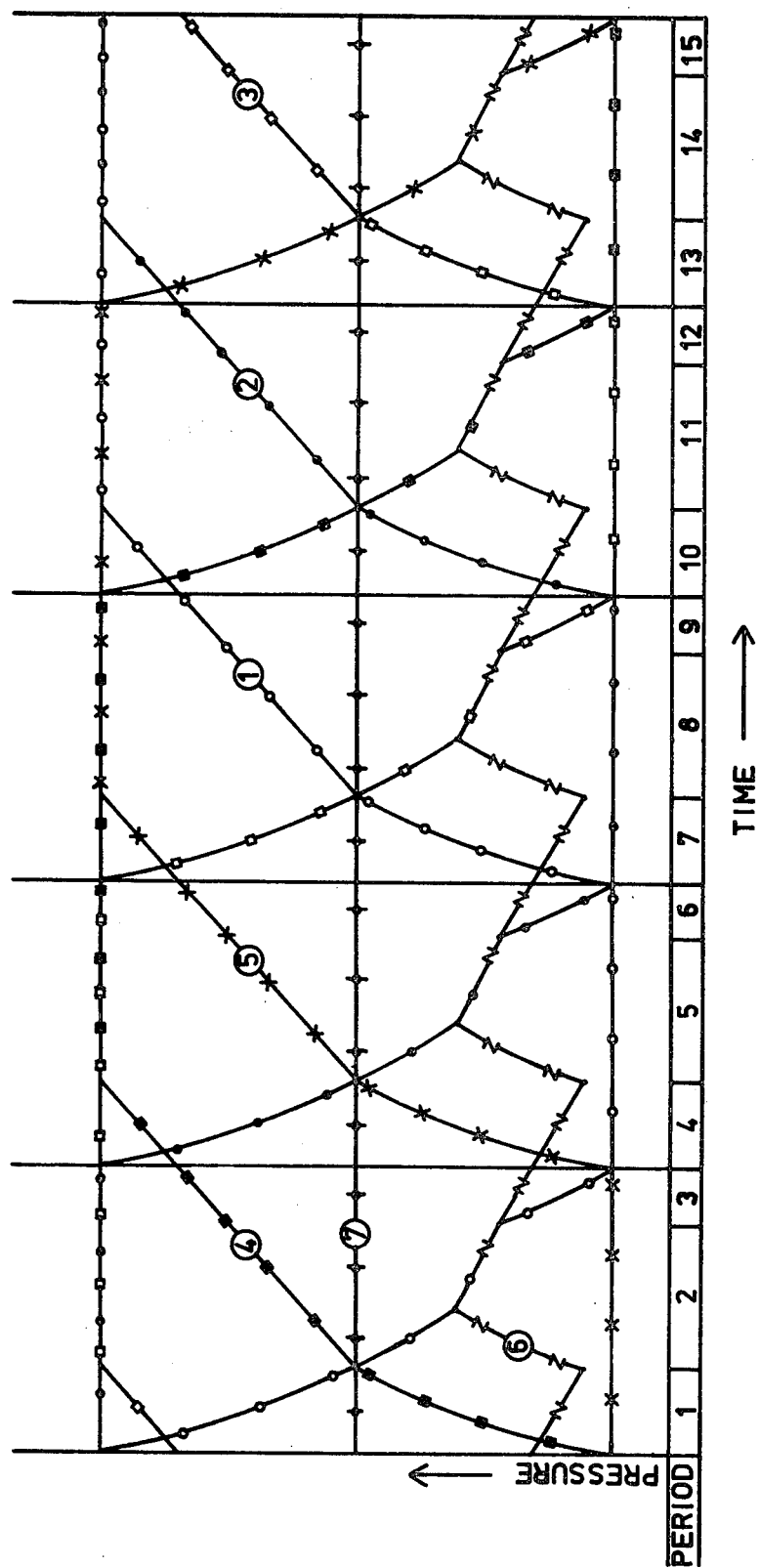

In the same way as described in example 2, it is possible to apply two additional variants.

lished without interference by the product slipstream as shown in FIG. 11 for the periods 1, 4, 7, 10 and 13.

The successive steps are explained as follows, on the basis of the steps executed by for instance adsorption zone 3 (see FIGS. 10 and 11) which starts the adsorption step with period 2, proceeding through period 3 and further through period 4 where the gas velocity is doubled. During periods 5 and 6 the gas velocity has returned to its original value. During period 7 recovered void space gas is nonreversedly reused through packed column 7 for repressurization of adsorption zone 1 until pressure equalization. Proceeding to period 8 further void space gas is recovered for nonreversed reuse as purgegas through packed column 6. During

TABLE 2

| NR. ADSORPTION ZONE | Adsorption Gas Velocities number of period in the cycle |||||||||||||||
|---|---|---|---|---|---|---|---|---|---|---|---|---|---|---|---|
| | 1 | 2–3 | 4 | 5–6 | 7 | 8–9 | 10 | 11–12 | 13 | 14–15 | 16 | 17–18 | 19 | 20–21 | 22 | 23–24 |
| 2 | 6 | 4 | | | | | | | | | | | | 4 | 6 | 4 |
| 3 | 6 | 4 | 6 | 4 | | | | | | | | | | | | 4 |
| 4 | | 4 | 6 | 4 | 6 | 4 | | | | | | | | | | |
| 5 | | | | 4 | 6 | 4 | 6 | 4 | | | | | | | | |
| 6 | | | | | | 4 | 6 | 4 | 6 | 4 | | | | | | |
| 7 | | | | | | | | 4 | 6 | 4 | 6 | 4 | | | | |
| 8 | | | | | | | | | | 4 | 6 | 4 | 6 | 4 | | |
| 1 | | | | | | | | | | | | 4 | 6 | 4 | 6 | 4 |

Firstly, the increase of the time spent for purging by advancing the start of depressurization via the inlet of adsorption zones, secondly, for initial first phase repressurizations to withdraw gas from column 1A via control valve 105 and further corresponding valves until pressure equalization.

For lower capacities and for cases where in addition a relatively low ratio of the highest to the lowest pressure is used and which therefore require relatively more purge gas, there is less need to maximize the use of void space gas for repressurization.

In the following example a system is described consisting of five adsorption zones and using variable gas velocities.

EXAMPLE 4

Figure 10:
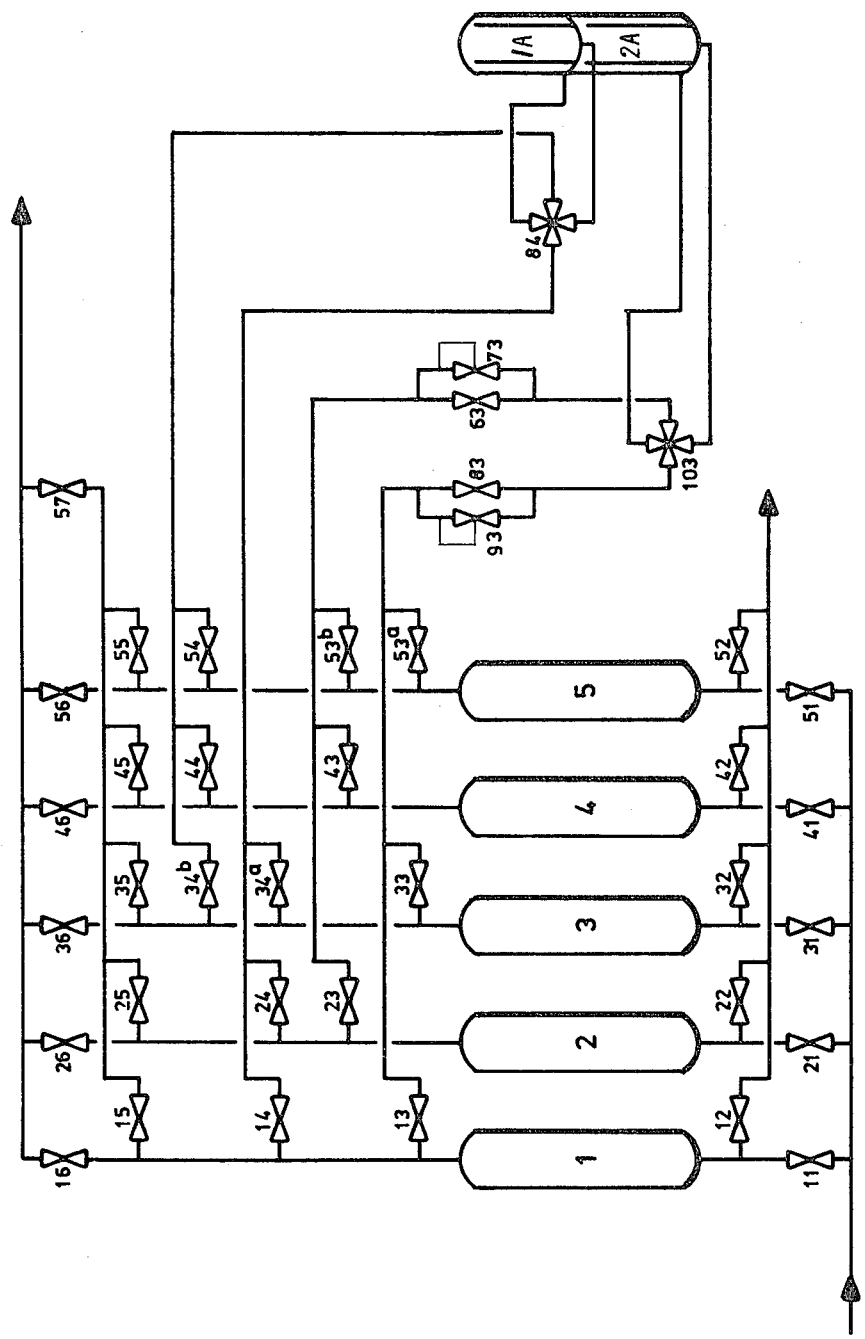

In FIG. 10, the typical scheme is shown consisting of the adsorption zones 1 through 5 and two packed columns 1A and 2A, while its operation is described by means of the time/pressure diagram of FIG. 11 and the valve switching program of FIG. 12. Control valve 57 constantly controls the product slip stream for last phase repressurization of adsorption zones.

The number of adsorption zones being in active adsorbing service is alternatingly 1 or 2. No provisions are shown for allowing the use of different gas velocities when two adsorption zones are operating in parallel. Such provisions could be made however in a similar way as shown in FIG. 2, using two supply headers with a distribution valve 10, distributing the total feed over the two headers and thereby over two different adsorption zones in the ratio's as required.

From FIG. 11 it follows, that for a final gas velocity of 4 cm/s, the gas velocity in each adsorption zone changes in the sequence 4, 8 and 4 cm/s, whereby during the period of the highest velocity only one adsorption zone is serving in active adsorption. In accordance with the principles as described above pressure equalization between two adsorption zones will be estabperiod 9 pressure is further reduced until the lowest level through gas release via the inlet. Column 6 continues to release gas for purging adsorption zone 2. Purging follows during periods 10, 11 and 12 after which during period 13 through non-reversed reuse of recovered void space gas the adsorption is repressured until pressure equalization, involving adsorption zones 3 and 5, and intermediate column 7, without any interference by the product slip stream. Final repressurization follows by means of the product slip stream during the periods 14, 15 and 1.

For a less stringent product purity it would be more attractive to delete packed column 7 as will be further discussed in the following example.

EXAMPLE 5

Figure 13:
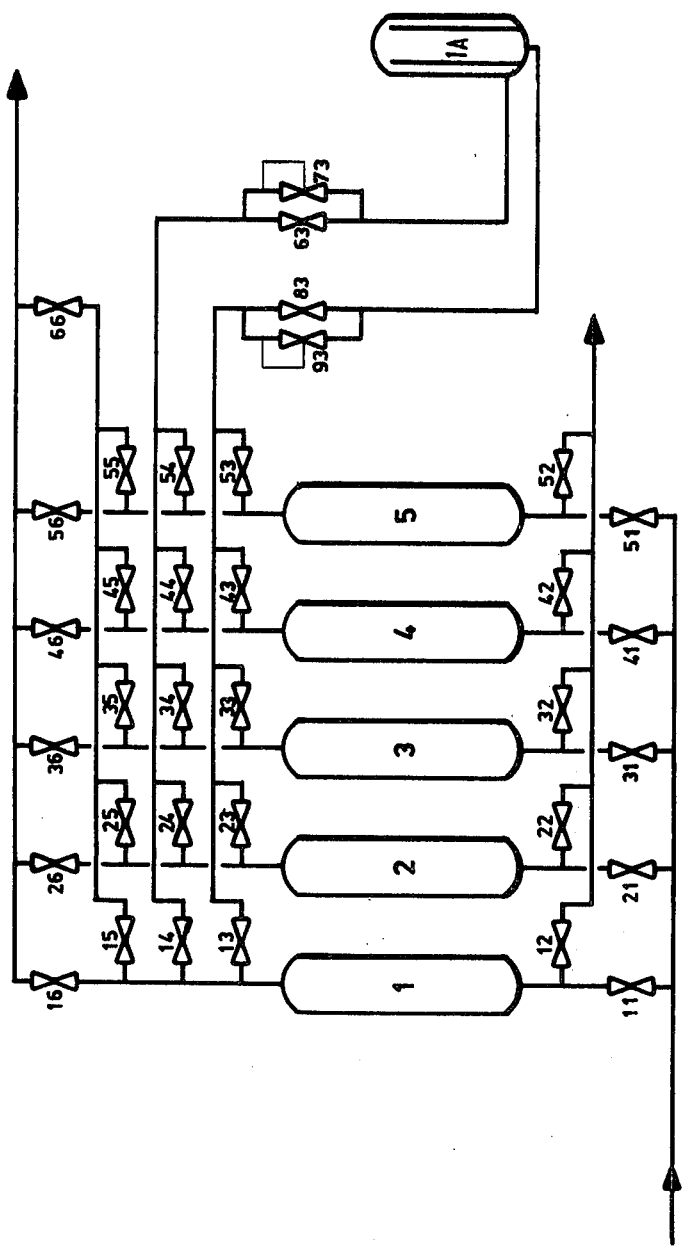

The five adsorption zones execute the same program as given in example 4, such that the same time/pressure diagram of FIG. 11 applies, the only difference being that packed column 1A has been deleted. The flow scheme as indicated by FIG. 13 is however basically different, using a reduced number of valves whereas the selector valves 84 and 103 of FIG. 10 are now deleted.

From the valve switching program of FIG. 14 it appears that with respect to adsorption zones two complete cycles are needed for completion of one cycle with respect to valve positions. Control valve 66 controls the product slip stream for last phase repressurization of adsorption zones.

Other possibilities for the nonreversed reuse of recovered void space gas concern cases where the number of adsorption zones is limited to four or three.

Possibilities for increasing the effectiveness of repressurization by eliminating the interference by the product slipstream do not exist.

Some possible variants are discussed below.

EXAMPLE 6

Figure 15:
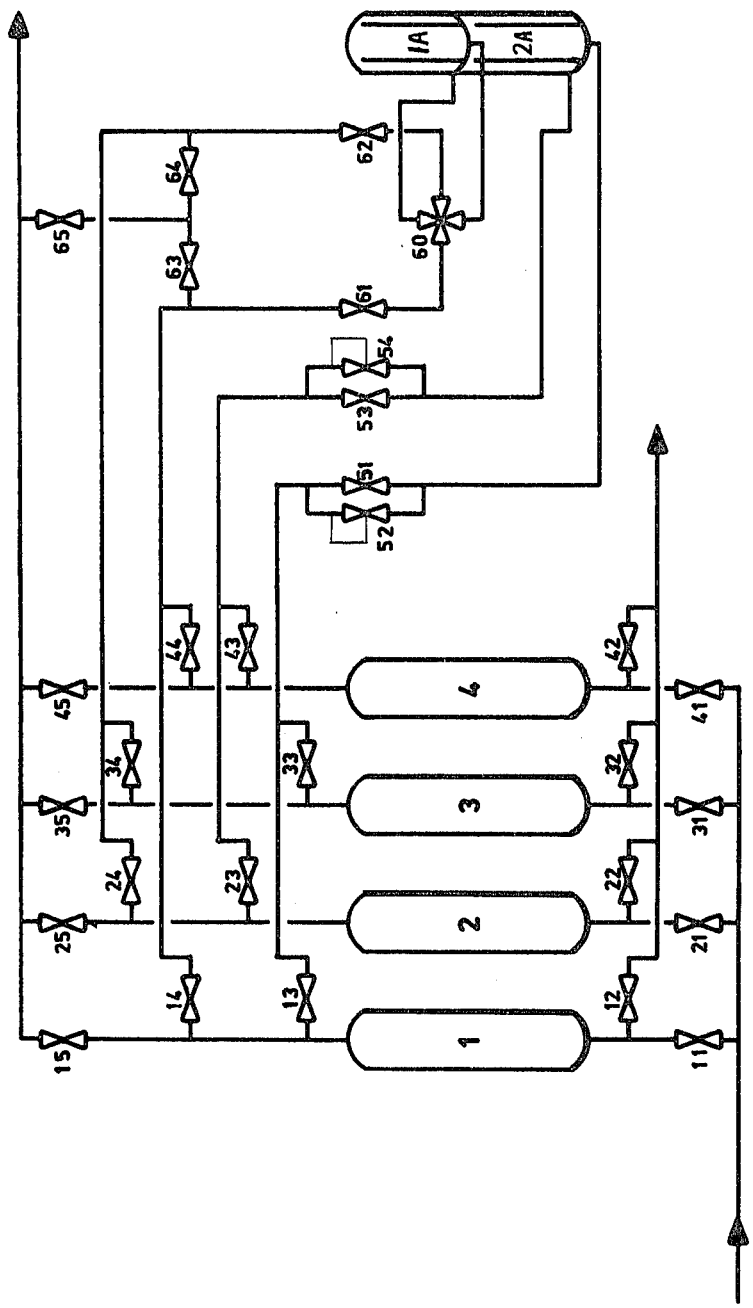
Figure 16:
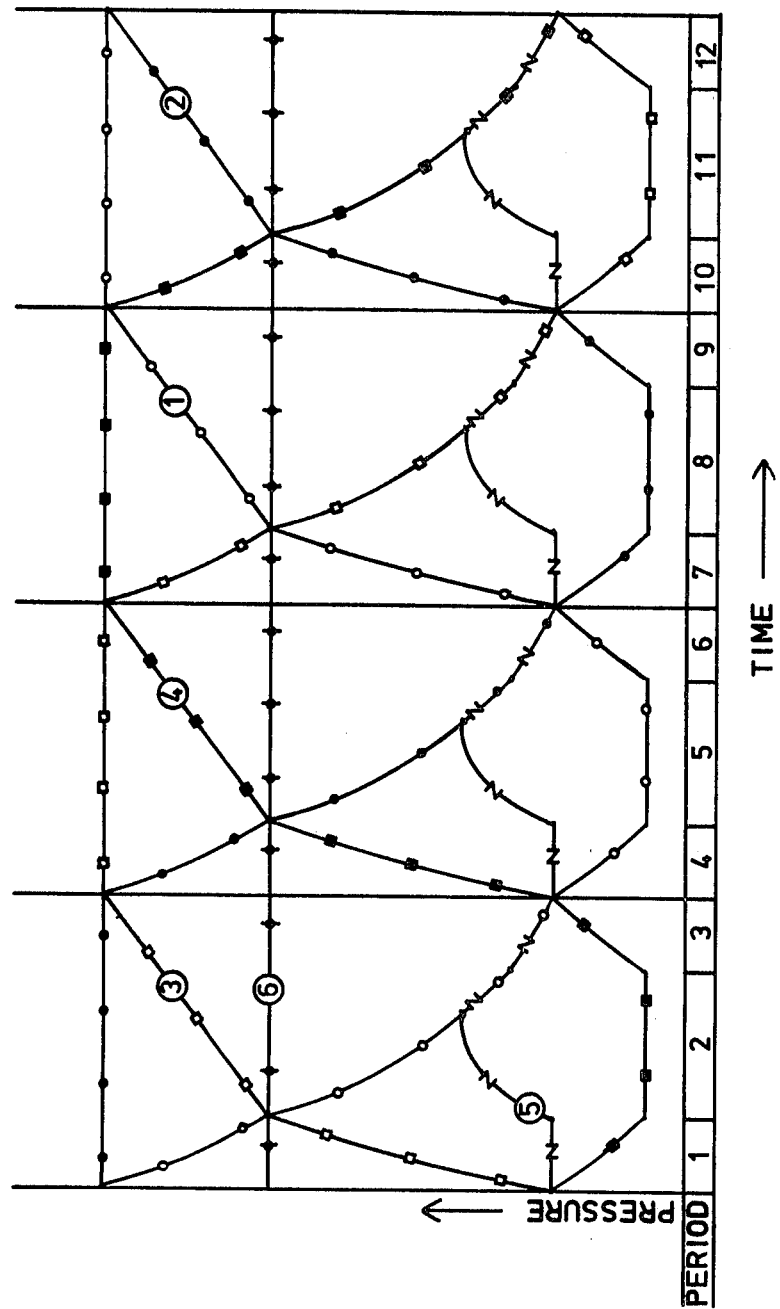

This example concerns a system consisting of four adsorption zones 1 through 4, operating in conjunction with two packed columns 1A and 2A as shown by FIG. 15.

Together with the time/pressure diagram of FIG. 16 and the valve switching program of FIG. 17, the operation is fully explained for a complete cycle. Control valve 65 controls the product slip stream for last phase repressurization of adsorption zones.

Extensive nonreversed reuse of recovered void space gas is employed for repressurization as well as for purging.

Repressurization of regenerated adsorption zones takes place in three phases. The effectiveness of repressurization by means of void space gas recovered in a first instant is however adversely affected by the product slipstream.

EXAMPLE 7

The difference with the installation as explained in example 6 is, that packed column 2A has been deleted and that the nonreversed reuse of recovered void space gas is employed only for purging and first phase repressurization.

The operation is fully explained by the time/pressure diagram of FIG. 16. (disregarding column 6), the flow scheme of FIG. 18 and the valve switching program of FIG. 19. Control valve 55 in this case controls the product slip stream for last phase repressurization of adsorption zones.

The advantage in comparison to the classical system of four adsorption zones, apart from the nonreversed reuse of recovered void space gas, concerns the improved flow conditions around first phase repressurizations during the periods 3, 6, 9 and 12, involving a relatively low gas velocity during the void space gas recovery against a much higher velocity and therefore accelerated first phase repressurizations, due the additional surge capacity of packed column 1A.

EXAMPLE 8

In this example a system is described consisting of three adsorption zones 1 through 3 and one packed column 1A. This alternative is preferred for small capacity installations and where a relatively small product recovery efficiency can be tolerated.

In addition to the valves indicated in FIG. 22, valve 45 is used to control a constant product slip stream for repressurization of adsorption zones.

Figure 20:
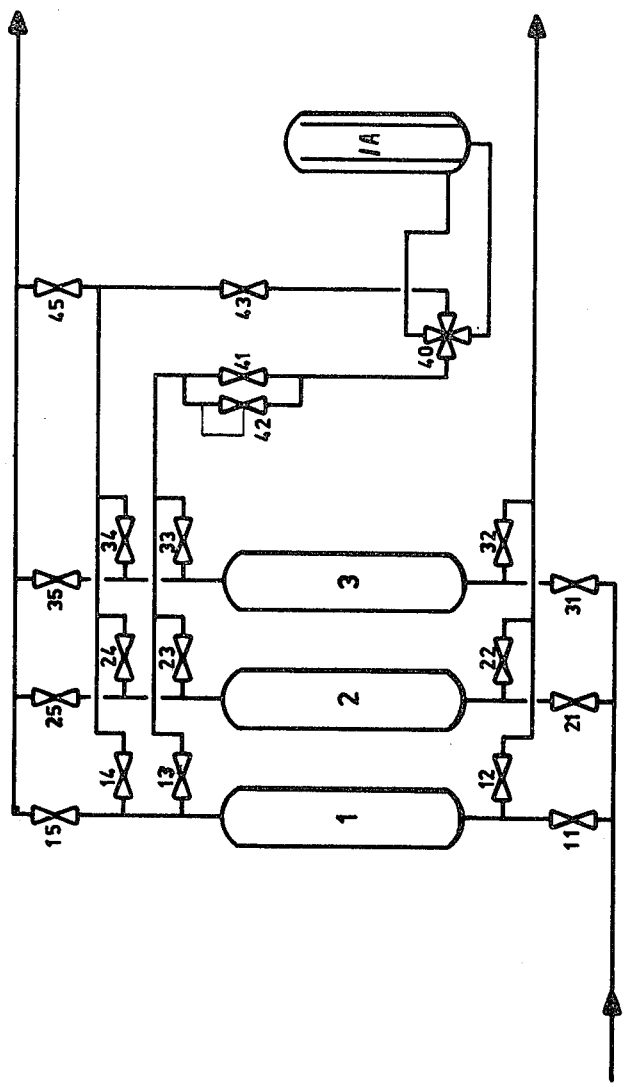
Figure 21:
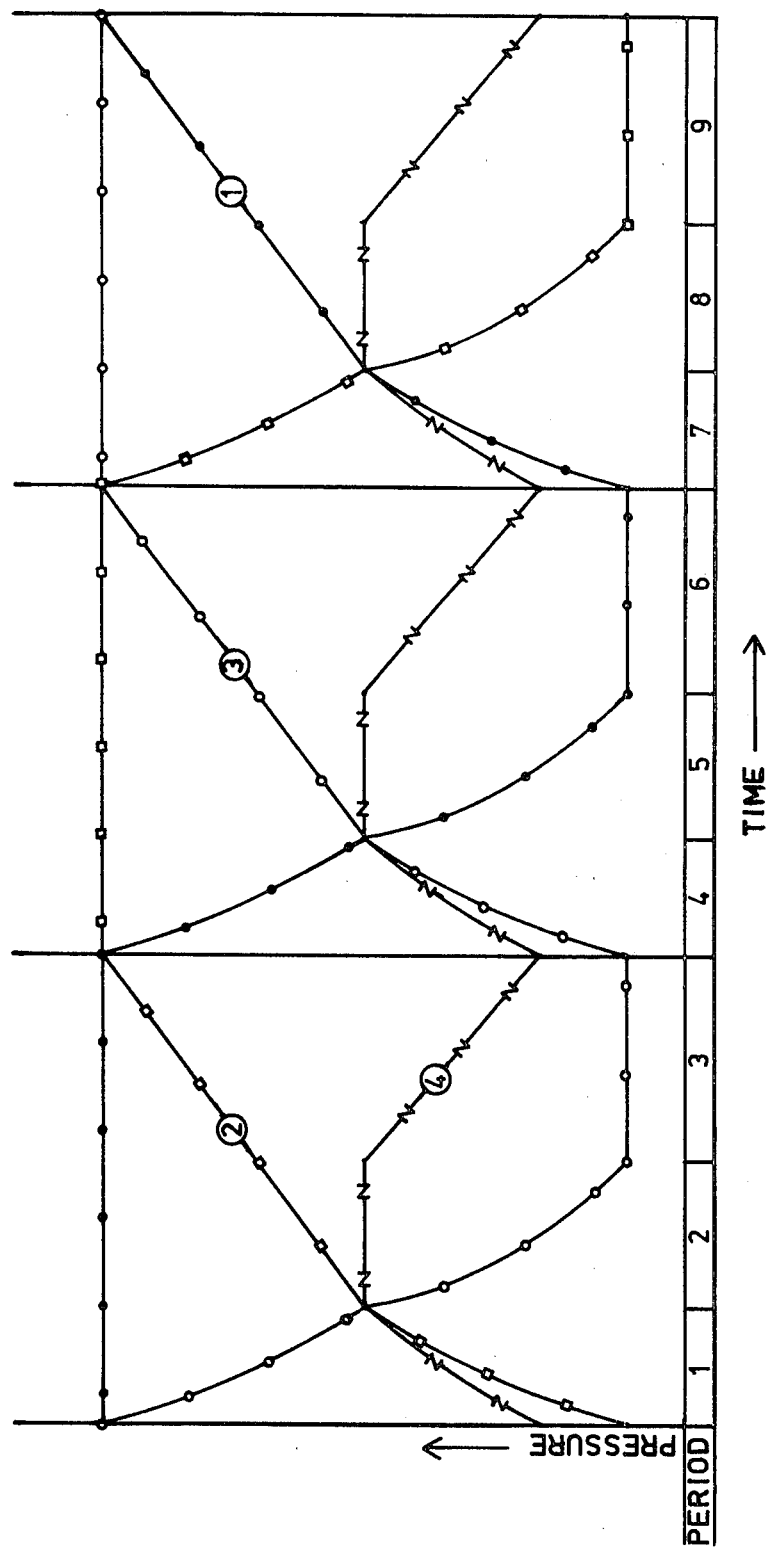

Referring to the FIGS. 20, 21 and 22 a complete cycle for for instance adsorption zone 1 is described as follows.

Feed gas is introduced during the periods 1, 2 and 3, which is followed by recovery of void space gas in period 4, whereby this gas for non-reversed reuse is introduced to packed column 1A thereby under a pressure rise substituting accumulated gas for repressurizing adsorption zone 3 together with the product slipstream, until at the end of this period pressure equalization is achieved involving the adsorption zones 1 and 3 and the intermediate column 1A. On proceeding to period 5 depressurization takes place via the inlet, followed by the purge step in period 6, using gas being released by column 1A, such that recovered void space gas is reused as purge gas in a nonreversed fashion.

Repressurization follows in period 7 by gas being released by column 2A, partly being substituted therefrom by void space gas, which is simultaneously recovered from adsorption zone 2, partly this latter gas itself and supplemented by the product slip stream. Final repressurization is achieved by the product slipstream during the periods 8 and 9.

By switching selector valve 40 at the start of every void space gas recovery i.e. at the start of periods 1, 4 and 7 it is made certain that any residual impurity which might have been left therein after release of purge gas is removed therefrom with the very first portion of gas used for repressurization such that this impurity is deposited at a deeper level in an adsorption zone.

EXAMPLE 9

Using an installation consisting of seven adsorption zones as explained in example 2, pure hydrogen is recovered from a feed gas of the following specification.

Composition in volume percent is: $H_2$: 73.8, CO: 2.5, $CO_2$: 17.7, $CH_4$: 4.9, $N_2$: 1.0, $H_2O$ : saturated, at a pressure of 22 bar and a temperature of 34 deg. C. The pressure of the waste gas is set at 1.7 bar. The adsorption zones have a diameter of 3.3 m, a height of 5.3 m, consist for the lower $\frac{2}{3}$ part of activated carbon with an average particle diameter of 1.5 mm and for the upper $\frac{1}{3}$ part of zeolite molecular sieve of the type 5 A in the form of 1 to 2 mm diameter granules. The volumes of the two packed column, each filled with $\frac{1}{2}$ inch Raschig rings are 22.5 $m^3$ for the exchange of repressurization gas, respectively 19.5 $m^3$ for the provision of purge gas.

The performance of the unit is summarized in table 3 below.

TABLE 3

| Supply of feed gas | ($Nm^3/h$) | 72,000 |
|---|---|---|
| Product gas | ($Nm^3/h$) | 45,000 |
| Purity Product gas | (volume %) | 99.999 |

For a total cycle duration of 9 minutes and 20 seconds, about 85% of the hydrogen contained by the feed gas is recovered as product gas, at a pressure of 21.3 bar.

EXAMPLE 10

A feed gas of the same specification as used in example 9 is purified by a unit consisting of four adsorption zones and one packed column as described in example 7.

The adsorption zones have a diameter of 1.5 m and a height of 5.0 m and consist for the lower $\frac{3}{4}$ part of activated carbon with an average particle diameter of 1.5 mm and for the remaining upper part of zeolitic molecular sieve of the type 5 A in the form of 1 to 2 mm diameter granules.

The volume of the packed column, which is filled with $\frac{1}{2}$ inch steel Raschig rings, amounts to 9.3 $m^3$.

The performance of the unit is summarized in table 4 below.

TABLE 4

| Supply of feed gas | ($Nm^3/h$) | 5000 |
|---|---|---|
| Product gas | ($Nm^3/h$) | 3000 |
| Purity Product gas | (volume %) | 99.999 |
| Pressure waste gas | (bar) | 1.7 |

For a total cycle duration of 16 minutes it appears that about 81% of the hydrogen contained by the feed gas is recovered as product gas, at a pressure of 21.6 bar.

EXAMPLE 11

Purge gas of an ammonia plant is purified for the recovery nitrogen next to hydrogen. The recovered mixture of hydrogen and nitrogen is recycled back to the synthesis loop combined with fresh synthesis gas make-ups thus achieving an increased efficiency with respect to the conversion of synthesis gas into ammonia.

An important feature of the process, whereby next to hydrogen nitrogen is recovered as well, is the fact that the adsorbent to a large extent remains loaded with nitrogen. Because of the presence of argon and methane next to nitrogen, whereas these components are not wanted to be present in the product gas, an adsorbent must be selected which exhibit a larger affinity to those components than to nitrogen. From gaschromatography literature it is apparent that such condition cannot be completely met.

The best compromise appears the selection of activated carbon for its considerably higher affinity to methane. Any difference between argon and nitrogen with respect to their affinities to activated carbon is however negligible, and so is the degree wherein any separation of these components, using activated carbon can be realized. On the other hand methane can be very well separated.

Due to the high concentration of nitrogen in the recovered void space gas, especially concerning the last fraction with the highest concentration which in accordance with this invention will be reused as purge gas in a nonreversed fashion, only a small quantity of hydrogen is lost during purging.

Since the amount of residual hydrogen left in adsorption zones after the recovery of void space gas is similarly small also very little is lost during depressurization via the inlet.

Through this simultaneous recovery of nitrogen together and mixed with hydrogen, the advantage does not remain restricted to the recycle of this reactant to the ammonia synthesis, it means in addition that a considerably higher recovery efficiency for hydrogen is achieved.

Purge gas from an ammonia synthesis plant has the following composition in volume percent: $H_2$: 62.1, $N_2$: 20.7, Ar: 6.2, $CH_4$: 8.0 and $NH_3$: 3.0. This gas is available at 26 bar and 20 deg. C. at a rate of 10,000 $Nm^3/h$, and it treated by an installation on the basis of example 5, consisting of 5 adsorption zones of activated carbon as used in the preceeding example 10, and one packed column filled with ½ inch steel Raschig rings.

Each adsorption zone has a diameter of 1.4 m and a height of approximately 5.0 m, while the volume of the packed column amounts to about 5 $m^3$.

For a total cycle duration of 2 times 11 minutes and 15 seconds, the performance of the unit is summarized in the following table 5.

TABLE 5

| | |
|---|---|
| Supply of feed gas ($Nm^3/h$) | 10,000 |
| Product gas ($Nm^3/h$) | 7,000 |
| Composition Product gas in volume percent | |
| $H_2$ | = 81.00 |
| $N_2$ | = 14.62 |
| $A_5$ | = 4.37 |
| $CH_4$ | = 0.01 |
| $NH_3$ | = nil |
| Pressure waste gas (bar) | 2.2 |

From these data it is concluded that the recovery efficiencies for hydrogen and nitrogen (including argon) amount to about 92% and 50% respectively.

In the above, a general description is given of the way in which various alternatives based on the essential criteria of this invention may be executed. Essential components concern the automatic valves, of which the functions in the preceeding examples have been presented by their usual symbols.

It is specifically stated however that a multitude of functions, usually requiring up to four two-way valves, may be combined by multi-way valves, especially of the selector rotary type.

What is claimed is:

1. A process for the purification of a hydrogen containing gas mixture by selective, adiabatic adsorption of impurities therein on an adsorbent, followed by desorption of the impurities and regeneration of the adsorbent by pressure relief and purging of the adsorbent at low pressure with less contaminated to practically pure gas and repressurization, while applying a number of zones containing adsorbent, said zones being used alternatively in a cyclic manner, characterized in that each cycle comprises a number of steps which, starting with a first adsorption zone wherein impurities have been adsorbed and the adsorption zone has become exhausted, comprise:

expanding a gaseous phase which is present in a void space of said first adsorption zone via the outlet thereof while the inlet thereof is closed;

introducing said expanded gas into an outlet of a regenerated adsorption zone until pressure equalization in both said regenerated and said first zones is obtained;

further expanding said gas present in said void space of said first adsorption zone through said outlet thereof;

introducing said further expanded gas into a packed column filled with an inert, non-porous packing material of high void fraction;

removing said further expanded gas from said voids in said column in a reverse direction by introducing a second further expanded gas from a second exhausted adsorption zone into an opposite end of said packing column;

introducing said removed gas either into a second regenerated adsorption zone via its outlet to partially pressurize the same or into said first adsorption zone for purging said first adsorption zone;

introducing a product quality gas from a product quality gas stream into said outlet of said first adsorption zone while said inlet thereof is closed until a pressure in said first adsorption zone is equal to a pressure of said product gas stream; and passing said hydrogen containing gas mixture containing said impurities into said inlet of said first adsorption zone and out of said outlet of said first adsorption zone.

2. The process according to claim 1, wherein 2 packed columns and not more than 7 and not less than 4 adsorption zones are used, said first packed column being used to avoid reversal of quality profiles of said gas used for repressurization, while said second of said packed columns is used to avoid reversal of quality profiles of said gas used for purging.

3. The process according to claim 1, wherein 1 packed column and not more than 6 and not less than 3 adsorption zones are used to avoid the reversal of quality profiles of said gas used for purging.

4. The process according to claim 1, wherein not less than 5 and not more than 8 adsorption zones are used, and further comprising the step of:

varying the number of adsorption zones which receive feed gas at the same time and allowing the gas velocities through said adsorption zones to vary so as to maintain a constant total flow of feed gas and product gas in order to reduce a time needed for adsorption for each adsorption zone.

5. The process according to claim 4, wherein 1 packed column is used to avoid reversal of quality profiles of said gas used for purging.

6. The process according to claim 4 or claim 5, wherein for repressurization of regenerated adsorption zones, high pressure product gas is exclusively used for the last phase of said repressurization.

7. The process according to claims 1, 4 or 5 wherein the functions of a maximum of 4 two-way valves are combined in a single five-way rotary selector valve.

* * * * *